Sept. 22, 1959 R. A. KOLPEK 2,905,745

TELEGRAPH SWITCHING CENTER ARRANGEMENT

Filed Nov. 29, 1956 11 Sheets-Sheet 1

INVENTOR.
ROBERT A. KOLPEK

BY Smith, Olsen, Baird and Miller

ATTYS.

Sept. 22, 1959 R. A. KOLPEK 2,905,745

TELEGRAPH SWITCHING CENTER ARRANGEMENT

Filed Nov. 29, 1956 11 Sheets-Sheet 2

INVENTOR.
ROBERT A. KOLPEK
BY Smith, Olsen, Baird and Miller
ATTYS.

TELEGRAPH SWITCHING CENTER ARRANGEMENT

INVENTOR.
ROBERT A. KOLPEK
BY
Smith, Olsen, Baird and Miller
ATTYS.

OUTGOING LINE FINDER
LINK CIRCUIT 400

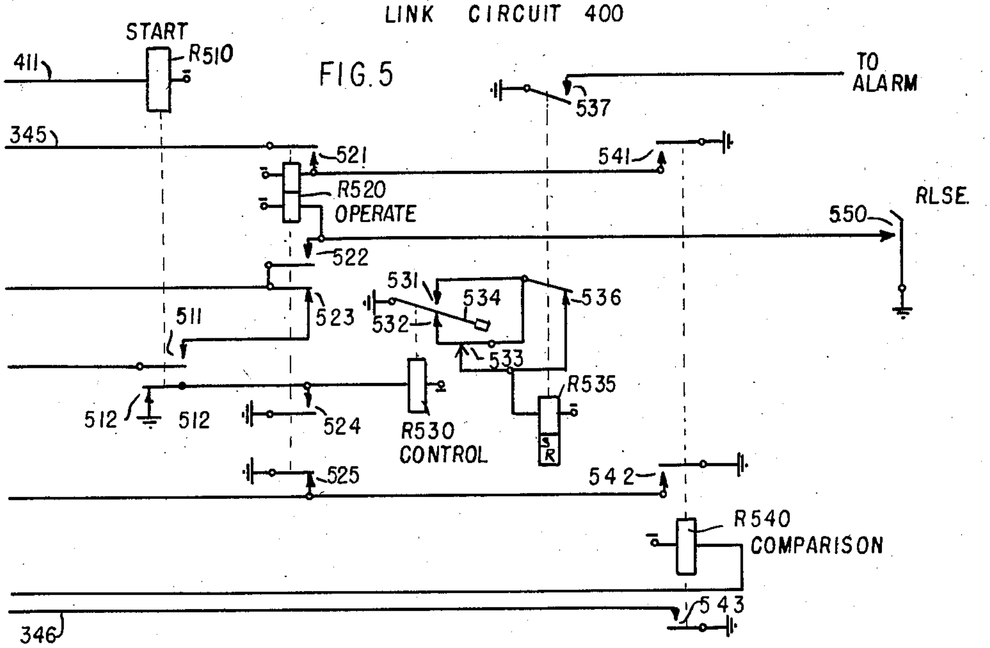

FIG. 5

| CHARACTER | | PUNCH POSITION A | B | C | D | E |
|---|---|---|---|---|---|---|
| A | | X | X | | | |
| B | | X | | | X | X |
| C | | | X | X | X | |
| D | | X | | | X | |
| E | 3 | X | | | | |
| F | | X | | X | X | |
| G | | | X | | X | X |
| H | | | | X | | X |
| I | 8 | | X | X | | |
| J | | X | X | | X | |
| K | | X | X | X | X | |
| L | | | X | | | X |
| M | | | | X | X | X |
| N | 9 | | | X | X | |
| O | 9 | | | | X | X |
| P | Ø | | X | X | | X |
| Q | 1 | X | X | X | | X |
| R | 4 | | X | | X | |
| S | BELL | X | | X | | |
| T | 5 | | | | | X |
| U | 7 | X | X | X | | |
| V | | | X | X | X | X |
| W | 2 | X | X | | | X |
| X | | X | | X | X | X |
| Y | 6 | X | | X | | X |
| Z | | X | | | | X |
| LTR | | X | X | X | X | X |
| FIG. | | X | X | | X | X |
| CR | | | | | X | |
| LF | | | X | | | |
| SP | | | | X | | |

FIG. 12
STANDARD TELEGRAPH
X= GRD.

| SW. POINT | CHARACTER SS 1000 | SS 960 | S 710 | S 720 | S 730 | SW POINT | CHAR. S |
|---|---|---|---|---|---|---|---|
| 1 | CR | SP | 0 | 0 | 1 | 26 | CR |
| 2 | CR | SP | 1 | 1 | 2 | 27 | LF |
| 3 | LF | SP | 2 | 2 | 3 | 28 | LF |
| 4 | L1 | SP | 3 | 3 | 4 | 29 | LF |
| 5 | L2 | SP | 4 | 4 | 5 | 30 | LF |
| 6 | L3 | CR | 5 | 5 | 6 | 31 | LF |
| 7 | FIG | CR | 6 | 6 | 7 | 32 | LF |
| 8 | T1 | LF | 7 | 7 | 8 | 33 | LF |
| 9 | T2 | X | 8 | 8 | 9 | 34 | LF |
| 10 | T3 | Z | 9 | 9 | 0 | 35 | LTR |
| 11 | T4 | X | | | | 36 | LTR |
| 12 | LTR | Z | | | | 37 | LTR |
| 13 | Z | X | | | | 38 | LTR |
| 14 | CR | Z | | | | 39 | LTR |
| 15 | CR | X | | | | 40 | LTR |
| 16 | LF | CR | | | | 41 | LTR |
| 17 | FIG | LF | | | | 42 | LTR |
| 18 | N | L1 | | | | 43 | LTR |
| 19 | N | L2 | | | | 44 | LTR |
| 20 | N | L3 | | | | 45 | LTR |
| 21 | N | FIG. | | | | 46 | LTR |
| 22 | N | N1 | | | | 47 | LTR |
| 23 | N | N2 | | | | 48 | LTR |
| 24 | N | N3 | | | | 49 | LTR |
| 25 | CR | LTR | | | | 50 | LTR |

FIG. 13
OUTGOING LINE CIRCUIT SWITCH FUNCTIONS

INVENTOR.
ROBERT A. KOLPEK
BY Smith, Olsen, Baird and Miller
ATTYS.

INVENTOR.
ROBERT A. KOLPEK
BY
Smith, Olsen, Baird and Miller
ATTYS.

Sept. 22, 1959 R. A. KOLPEK 2,905,745

TELEGRAPH SWITCHING CENTER ARRANGEMENT

Filed Nov. 29, 1956 11 Sheets-Sheet 6

INVENTOR.
ROBERT A. KOLPEK

BY Smith, Olsen, Baird and Miller

ATTYS.

TELEGRAPH SWITCHING CENTER ARRANGEMENT

Filed Nov. 29, 1956 11 Sheets-Sheet 7

INVENTOR.
ROBERT A. KOLPEK
BY
Smith, Olsen, Baird and Miller
ATTYS.

Sept. 22, 1959 R. A. KOLPEK 2,905,745

TELEGRAPH SWITCHING CENTER ARRANGEMENT

Filed Nov. 29, 1956 11 Sheets-Sheet 8

INVENTOR.
ROBERT A. KOLPEK

BY Smith, Olsen, Baird and Miller

ATTYS.

INVENTOR.
ROBERT A. KOLPEK
BY Smith, Olsen, Baird and Miller
ATTYS.

TELEGRAPH SWITCHING CENTER ARRANGEMENT

Filed Nov. 29, 1956 11 Sheets-Sheet 10

INVENTOR.
ROBERT A. KOLPEK
BY
Smith, Olsen, Baird and Miller
ATTYS.

INVENTOR.
ROBERT A. KOLPEK
BY
Smith, Olsen, Baird and Miller
ATTYS.

United States Patent Office 2,905,745

Patented Sept. 22, 1959

2,905,745

TELEGRAPH SWITCHING CENTER ARRANGEMENT

Robert A. Kolpek, Libertyville, Ill., assignor to General Telephone Laboratories, Incorporated, a corporation of Delaware Application November 29, 1956, Serial No. 625,098

7 Claims. (Cl. 178—2)

The present invention relates to an automatic telegraph system and particularly to arrangements in message centers of the telegraph system for completing connections between message storage units therein and outgoing lines extending to message destinations and for controlling transmission of the telegraph message signals over the outgoing line.

The automatic telegraph system to which the present invention relates is of the nation-wide type disclosed in the copending application of Richard C. Stiles, Serial No. 260,854, filed December 10, 1951, now Patent No. 2,805,283, granted on September 3, 1957, including a plurality of geographically located message switching centers which are inter-linked by transmission lines and which serve multiply as message distribution points, relay points between transmission lines, and as message terminal points. Accordingly, each switching center is provided with a plurality of incoming and outgoing lines respectively extending from and to other switching centers. In each switching center, each incoming line is terminated in an incoming line circuit which receives the telegraph messages transmitted over the incoming line and perforates a tape to make a record of the telegraph message. Each outgoing line is terminated in an outgoing line circuit by means of which the outgoing line is seized and through which transmission of the telegraph message signals over the outgoing line is controlled. In the switching center there is also provided a plurality of cross-office units which are accessible to any one of the incoming line circuits and which have access to any one of the outgoing line circuits and which is provided with selectively operative equipment for receiving telegraph messages from any one of the incoming line circuits seized thereto and for perforating a tape to make a record of the telegraph message, whereby the cross-office unit functions in this operation as a message storage unit. Additionally the cross-office unit is controllable for marking itself as calling to any one of the outgoing line circuits and for seizing the one of the outgoing line circuits when the line circuit is idle and thereafter operates with the seized outgoing line circuit to transmit the telegraph message over the outgoing line.

In the above mentioned Stiles application it is disclosed that each telegraph message has assigned one of a plural number of transmission precedence ratings and a cross-office unit which is calling to an outgoing line circuit marks to the outgoing line circuit the transmission precedence rating of the message stored therein. When there are two or more cross-office units calling to the same outgoing line circuit having messages of different transmission precedence ratings therein, only the calling cross-office unit having stored therein the message of the highest transmission precedence rating will be permitted to seize the idle outgoing line circuit. By way of example, a telegraph message may have a transmission preference rating, proceeding from the highest to lowest order of precedence, of: flash precedence, emergency precedence, operational immediate precedence, priority precedence, routine precedence, and deferred precedence; with five cross-office units calling to the same outgoing line circuit and having messages therein of the respective different transmission precedence ratings, the cross-office units will be permitted to seize the outgoing line circuit in accordance with the precedence ratings of the messages stored therein and in the order listed above.

It is an object of the present invention to provide in a telegraph message switching center, which is adapted to process a large number of telegraph messages during any operational period and to transmit the telegraph message over any one of a larger number of outgoing lines, an improved linking arrangement between cross-office message storage units and the outgoing line circuits, whereby all of the cross-office units, irrespective of the transmission precedence rating of the messages stored therein, may be marked as calling to any one of the outgoing line circuits and only one of the cross-office units of the highest precedence rating may seize the idle outgoing line circuit.

An additional object of the invention is to provide in a telegraph message switching center an arrangement whereby any cross-office units calling to a particular outgoing line seizes the group of outgoing line circuits that includes the corresponding outgoing line circuit and marks the corresponding outgoing line circuit as called, and in response thereto linking means completes a connection between the called outgoing line circuit and the one of calling cross-office units having stored therein a message of the highest transmission precedence.

A further object of the invention is to provide an improved arrangement in a telegraph message switching center including a plurality of cross-office message storage units, a plurality of outgoing lines accessible to the cross-office units through corresponding outgoing line circuits, and a linking arrangement therebetween, whereby any cross-office units calling to a particular outgoing line makes a preliminary seizure of the corresponding outgoing line circuit and marks to the outgoing line circuit and to the linking arrangement the transmission precedence ratings of the messages stored therein, the seized outgoing line circuit marks itself as called to the linking arrangement, and the linking arrangement finds the called outgoing line circuit, registers the highest of the transmission precedence ratings marked to the outgoing line circuit, searches through the ones of the cross-office units marked as calling and seizes one of the calling cross-office units having the same transmission precedence marking as that transmission precedence registered therein, whereupon the seized cross-office unit is operated to complete a connection to the seized outgoing line circuit.

A further object of the invention is to provide in a telegraph switching center of the type described an improved outgoing line circuit which is controllable from a cross-office unit for performing operations with regard to the linking arrangement in order to complete a connection with a calling cross-office unit and for retransmitting from the seized cross-office unit to a monitor unit associated with the outgoing line certain message identity information at the same time that the outgoing line circuit transmits certain start-of-message information over the outgoing line, and is thereafter controlled to retransmit the message body information from the cross-office unit to the monitor unit and over the outgoing line, and is thereafter controlled to transmit certain identity and end-of-message information to the monitor unit and over the outgoing line.

An additional object of the invention is to provide in a telegraph switching center of the type described an improved cross-office unit which is controllable in response to the seizure of the called outgoinng line circuit by the linking arrangement for marking the cross-office unit as calling to the linking arrangement and for marking the transmission precedence of the message stored therein to the linking arrangement and in response to seizure by the linking arrangement is controlled to complete a connection to the outgoing line circuit.

An additional object of the invention is to provide in a telegraph switching center of the type described a linking arrangement between cross-office units and outgoing line circuits including an outgoing line finder link having access to a group of outgoing line circuits and connected back to back to a number of cross-office unit assigner links corresponding respectively to the number of groups of cross-office units having access to the group of outgoing line circuits served by the finder link, wherein the finder link is controlled by any called one of the outgoing line circuits to seize a called one of the outgoing line circuits and to register the highest transmission of precedence of any message directed thereto and to mark the registered precedence to the associated cross-office assigner links and wherein the cross-office assigner links are controlled by any one of the calling cross-office units associated therewith in response to the seizure of the corresponding called outgoing line circuit by the line finder link to hunt through the cross-office units and to seize the first one thereof having stored therein a message of a transmission precedence corresponding to that transmission precedence marked to the cross-office assigner link by the outgoing line finder link.

Further features of the invention pertain to the particular arrangements in the circuits of the telegraph switching center, whereby the above outlined and additional operating features thereof are attained.

The invention, both as to its organization and method of operation, together with further objects and advantages thereof, will be best understood by reference to the following specification taken in conjunction with the accompanying drawings, in which:

Figures 1A and 1B, taken together, show in block form a telegraph switching center including the outgoing linking arrangement in accordance wtih the invention;

Figs. 2 to 10, inclusive, show in detail the circuit included in the outgoing linking arrangement of the invention;

Fig. 12 is a table showing the standard telegraph code employed in the circuits of the switching centers; and Fig. 13 is a table showing the information transmission functions of various switches included in the outgoing line circuits of the invention.

*The general arrangement of the switching center*

Figure 11:
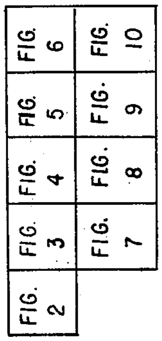
Fig. 11 illustrates the manner in which Figs. 2 to 10 inclusive are joined to provide a complete operating arrangement.
Figure 1A:
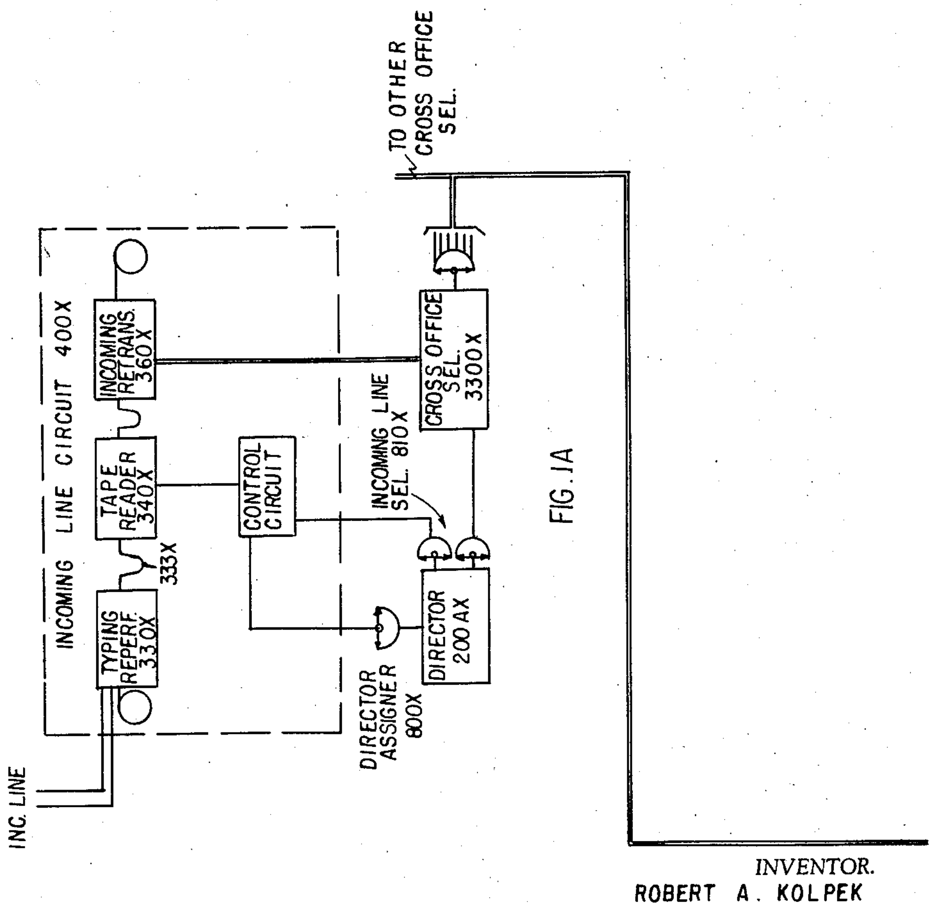
Figure 1B:
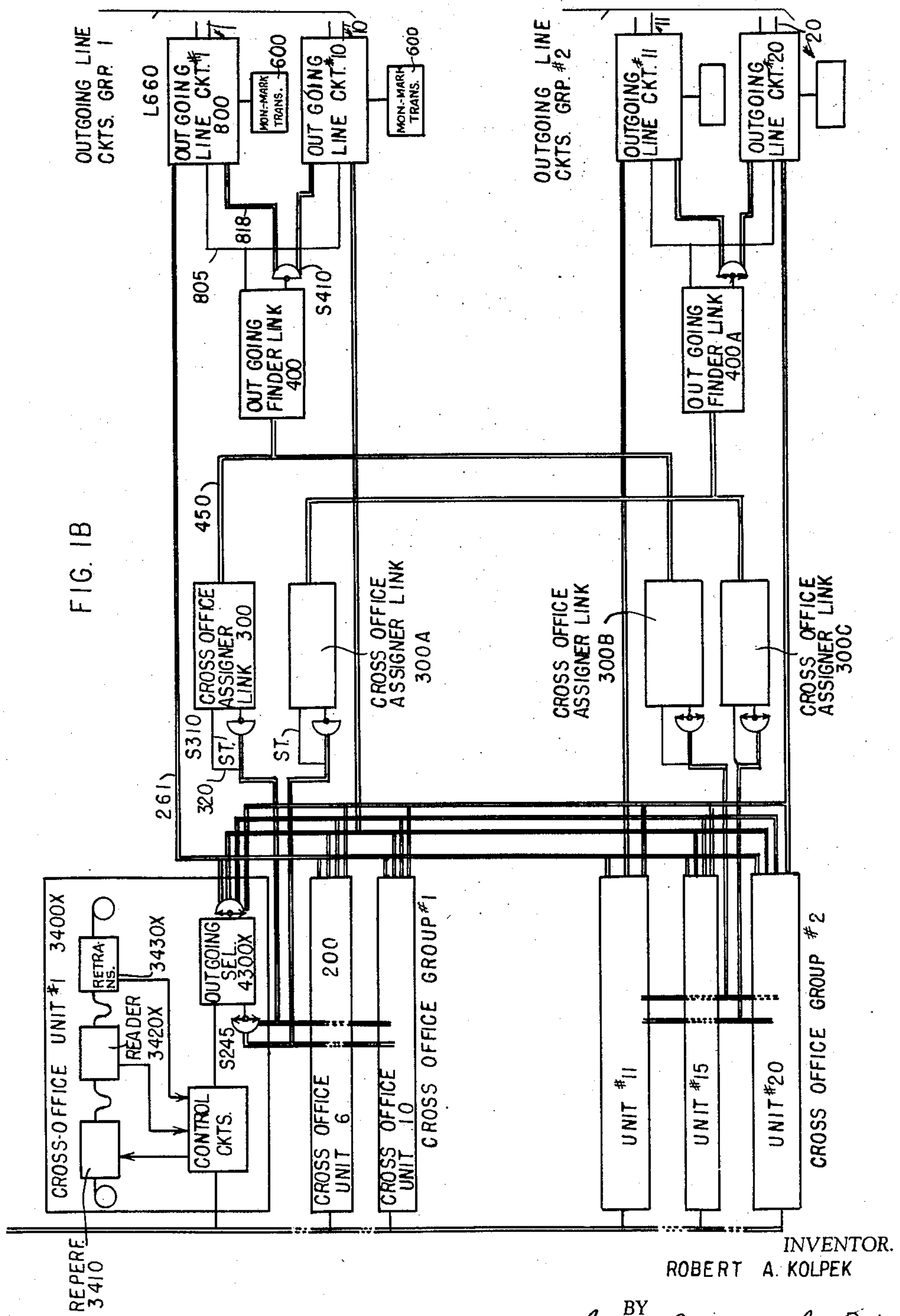

Referring specifically to Figs. 1A and 1B, the switching center there illustrated in block schematic form is but one of a plurality of such centers in an automatic telegraph switching system serving a large communication area and corresponds to the switching center disclosed in the copending application to Richard C. Stiles, Serial No. 260,854, filed December 10, 1951. The switching center here illustrated is adapted to serve a plurality of telegraph lines incoming thereto and to route telegraph messages received over the incoming lines to appropriate outgoing lines extending to the message destinations.

Insofar as the switching center of the present invention corresponds to the switching center disclosed in the above mentioned Stiles application, the apparatus and circuit elements common therebetween have been given the same titles as used in the Stiles application and the same identification numerals with the suffix X added thereto.

In the switching center shown in Figs. 1A and 1B there is provided a plurality of incoming line circuits, including the incoming line circuit 400X, each terminating an individually associated telegraph line, a plurality of cross-office units arranged in groups and including the cross-office unit 3400X and 200, and a plurality of outgoing line circuits each terminating an outgoing line and arranged in groups and including the outgoing line circuit 800. Any one of the outgoing line circuits in any one of the groups thereof is accessible to any one of the cross-office units in any one of the groups thereof.

Each group of outgoing line circuits has associated therewith an outgoing line finder link, such as the outgoing line finder link 400 associated with the Group No. 1 of outgoing line circuits, which has access to any one of the outgoing line circuits in the group. Each group of cross-office units has associated therewith a number of cross-office assigner links, such as the cross-office assigner link 300, corresponding to the number of groups of outgoing line circuits to which the group of cross-office units have access. Thus, as shown in Fig. 1B, the Group No. 1 of cross-office units has access to Groups No. 1 and No. 2 of outgoing line circuits and has associated therewith the cross-office assigner links 300 and 300A both of which have access to any one of the cross-office units in the Group No. 1, the former being connected back to back to the outgoing line finder link 400 associated with the Group No. 1 of outgoing line circuits and the latter being connected back to back to the outgoing line finder link 400A associated with the Group No. 2 of outgoing line circuits. In a similar manner the cross-office units of Group No. 2 which have access to the Groups No. 1 and No. 2 of outgoing line circuits, have associated therewith the cross-office assigner links 300B and 300C both of which have access to any one of the cross-office units in the Group No. 2, the former being connected back to back to the outgoing line finder link 400 and the latter being connected back to back to the outgoing line finder link 400A. Through this arrangement any one of the outgoing line circuits in the groups thereof, such, for example, as the outgoing line circuit 800, may be seized to any one of the cross-office units in the Groups No. 1 and No. 2 thereof, such, for example, as the cross-office unit 200, by means of an outgoing line finder link and a cross-office assigner link and, specifically in the examples cited, by means of the outgoing line finder link 400 and the cross-office assigner link 300.

The number of cross-office units per group and the number of outgoing line circuits per group is determined by the message traffic through the switching center and, by way of example only, each cross-office group is illustrated as including ten outgoing line circuits, though it is understood that a greater or lesser number of units may be included in any group of cross-office units or outgoing line circuits.

Each incoming line circuit, such as the incoming line circuit 400X, includes therein a typing reperforator 330X for perforating a tape 333X in accordance with the telegraph message received over the incoming line, a tape reader 340X for sensing the perforations in the tape and for performing in response thereto certain control functions, and an incoming line retransmitter 360X which is selectively operative for retransmitting the telegraph message perforated on the tape 333X. The tape reader 340X and the control circuits associated therewith operates the director 200AX to select an idle cross-office unit and to identify the outgoing line over which the message must be transmitted in order for it to arrive at its destination. Having performed these functions, the director 200AX operates the cross-office selector 3300X to connect to a selected one of the cross-office units and causes the selected cross-office unit to have transmitted thereto the information regarding the identified outgoing line and the transmission precedence of the telegraph message. Thereafter the director 200AX retires from the connections and the incoming line retransmitter 360X is operated to transmit signals corresponding to the telegraph message perforated in the tape to the selected cross-office unit. Upon completion of transmission of the telegraph message, the incoming line circuit 400X and the apparatus associated therewith is restored to normal and prepared to receive another telegraph message over the incoming line. The details of the mode of operation of the circuits in the incoming line circuit 400X, the director 200AX and cross-office selector 3300X is set forth in detail in the above mentioned Stiles application.

Each cross-office unit, such as the cross-office unit 3400X, is provided with apparatus such as that illustrated in Fig. 1B including a supply of perforating tape 3413X, a tape reperforator 3410X, a tape reader 3420X, an outgoing retransmitter 3430X, an outgoing selector 4300X, and a group of control circuits. The group of control circuits operates the tape reperforator 3410X in order to perforate the tape 3413X in accordance with the telegraph message signals received in the cross-office unit and to operate the outgoing selector 4300X for selecting the connection to the designated outgoing line. At the time that the cross-office unit is switched through to the designated outgoing line the control circuits are then operated in order to cause the perforated tape to be fed through the tape reader 3420X and the outgoing retransmitter 3430X in order to cause the telegraph message perforated thereon to be transmitted over the outgoing line. Selected portions of the cross-office unit 3400X deemed necessary to a proper understanding of the invention is disclosed in the cross-office unit 200 of Figure 2, and the details of the apparatus and method of operation of the cross-office unit 3400X with regard thereto will be understood by reference to the above mentioned Stiles application.

*Apparatus incorporated in the switching center*

Figure 2:
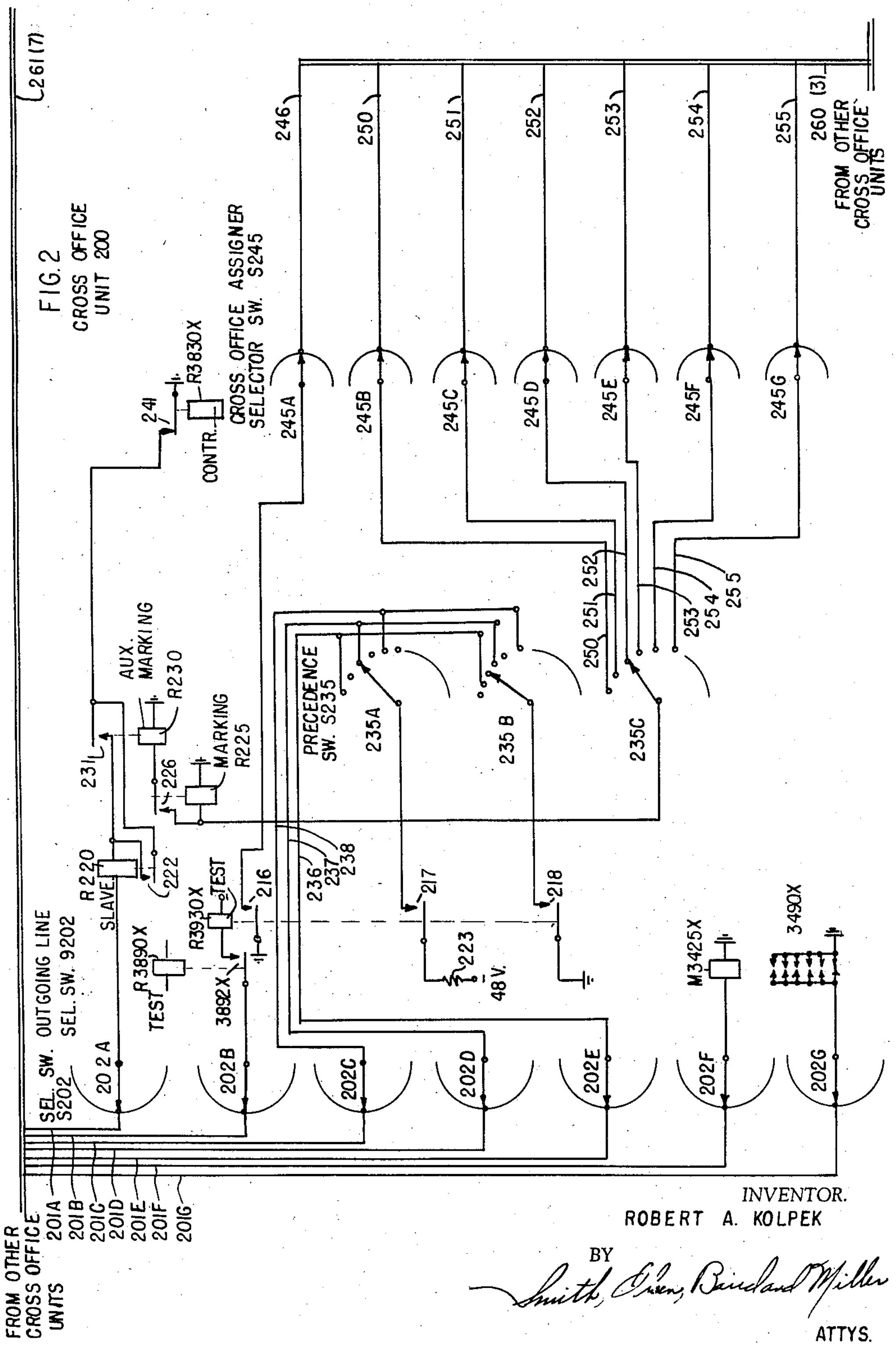

Referring now to Fig. 2, the cross-office unit 200 shown in part therein is provided with a group of relays including a test relay R3890X, a test relay R3930X, a slave relay R220, a marking relay R225, an auxiliary marking relay R230, and a control relay R3830X. Further, there is included an outgoing line selector switch S202, a precedence switch S235, and a cross-office assigner selector switch S245. In addition, there is included a set of sensing contacts 3490X associated with the outgoing line retransmitter of the cross-office unit and a clutch magnet M3425X for operating the sensing contacts 3490X. The outgoing line selector switch S202 is made up of seven sets of wipers and associated banks of contacts wherein each set of contacts in the banks are connected via a trunk, such as the trunk 261, to an individual one of the outgoing line circuits, such as the outgoing line circuit 800, and the wipers of the selector switch S202, are set, in accordance with the information transmitted from the cross-office selector 3300X, for extending a connection to the outgoing line over which the message in the cross-office unit must be transmitted to reach its desired destination. The precedence switch S235 includes three wipers and associated contact banks wherein the wipers thereof are set in accordance with the information transmitted from the cross-office selector 3300X to mark the transmission precedence of the message to the outgoing line circuit and to the designated cross-office assigner link. The cross-office assigner selector switch S245 is made up of seven wipers and associated contact banks wherein each set of contacts is connected via a trunk, such as the trunk 260, to an individual one of the cross-office-unit assigner links, such as the cross-office assigner link 300. The wipers of the selector switch S245 are set in accordance with the setting of the wipers of the outgoing line selector switch S202 to engage the contacts extending a connection to the cross-office assigner link corresponding to the group of outgoing line circuits including the outgoing line circuit terminating the called outgoing line.

Figure 3:
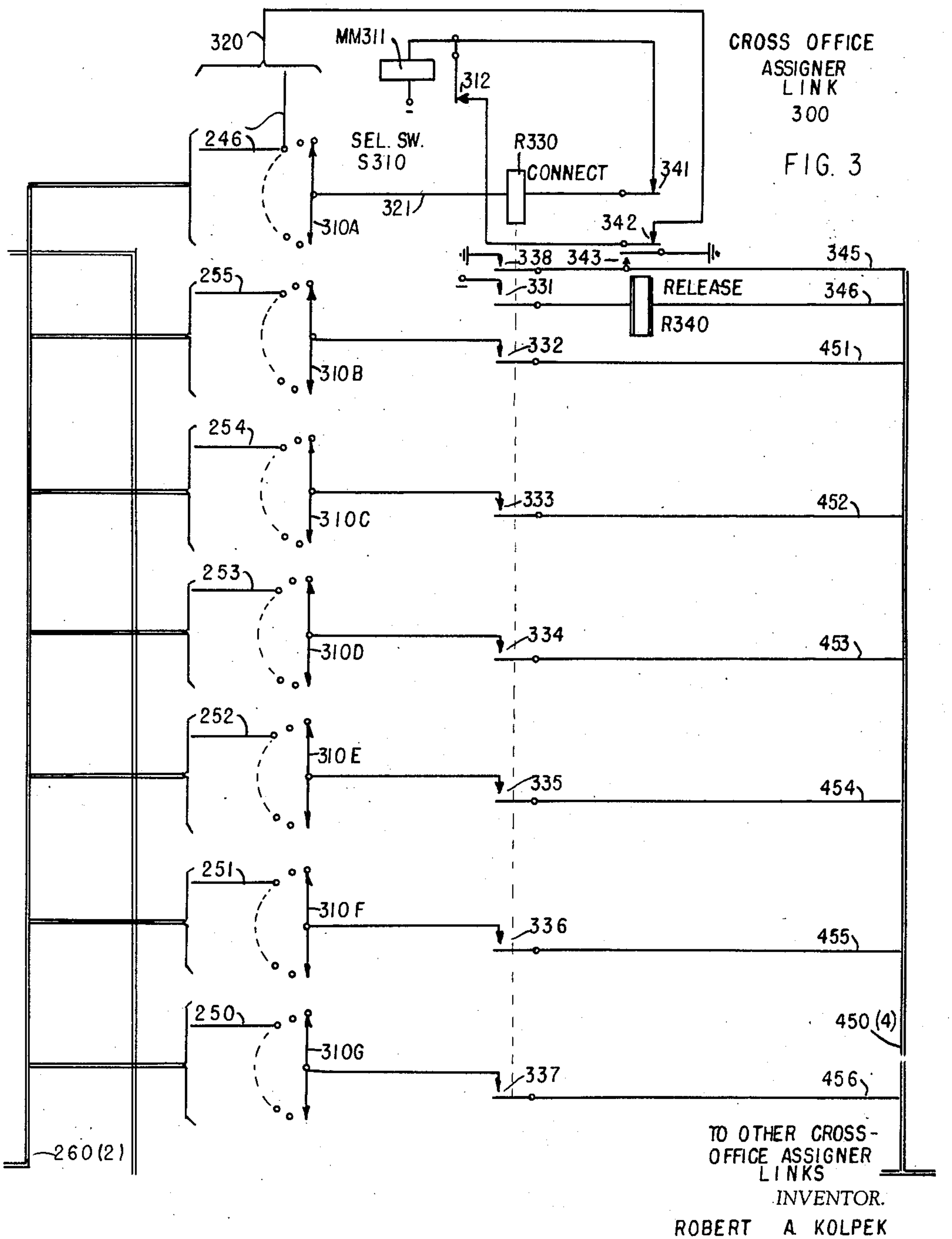

The cross-office assigner link circuit 300, shown in Fig. 3, includes a connect relay R330 and a release relay R340, and a selector switch S310 having associated therewith a motor magnet MM311. The selector switch S310 includes seven wipers and associated contact banks that correspond respectively to the contact banks of the cross-office assigner selector switch in the cross-office units.

Figure 4:
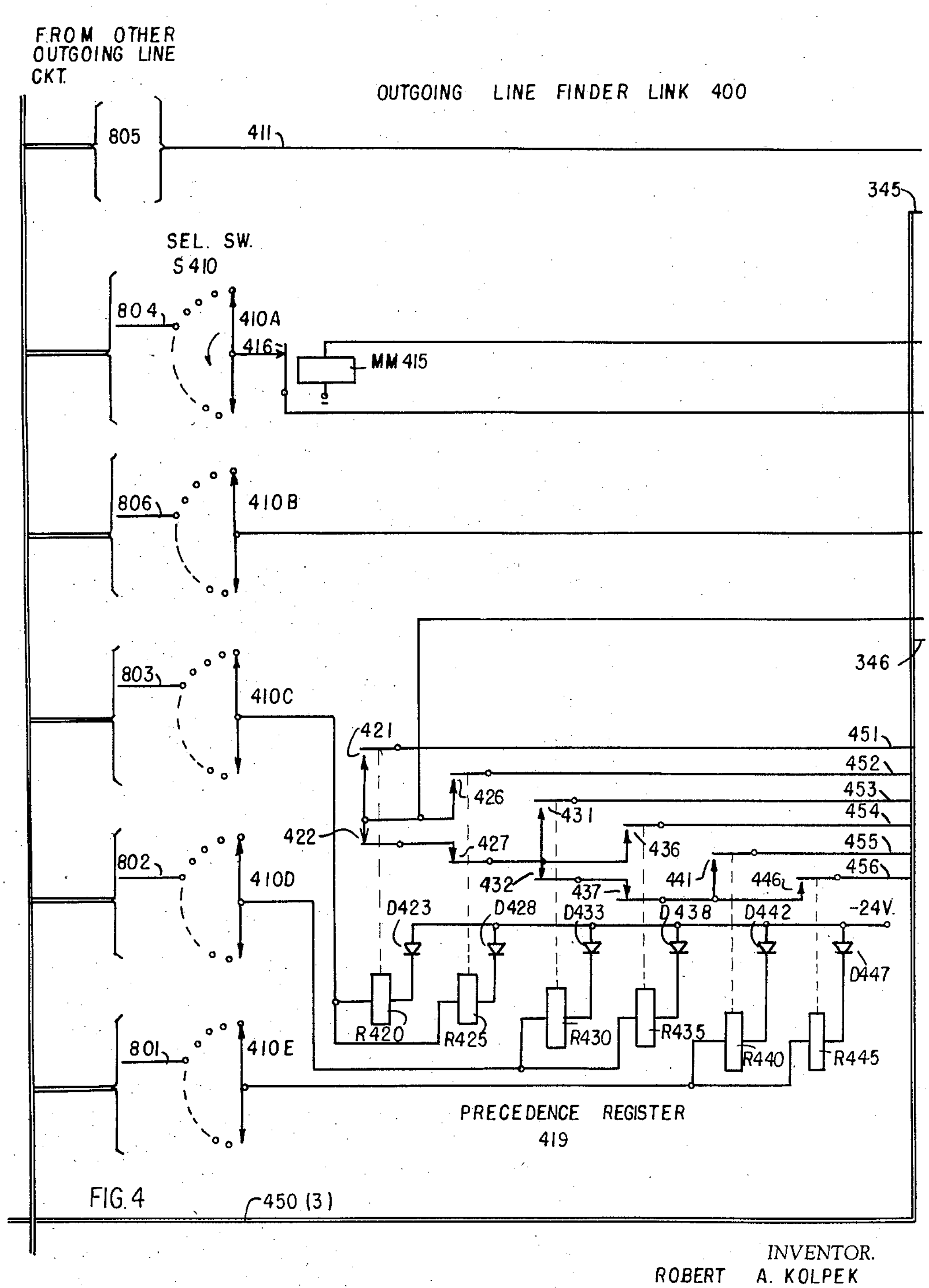

The outgoing line finder link circuit 400, illustrated in Figs. 4 and 5, includes a precedence register 419 provided with a group of relays R420, R425, R430, R435, R440 and R445 and a group of diodes D423, D428, D433, D438, D442, and D447. Additionally, there is provided in the outgoing line finder link circuit 400 a selector switch S410 having associated therewith a motor magnet MM415, and a group of control relays including a start relay R510, an operate relay R520, a control relay R530, an alarm relay R535, and a comparison relay R540.

Figure 6:
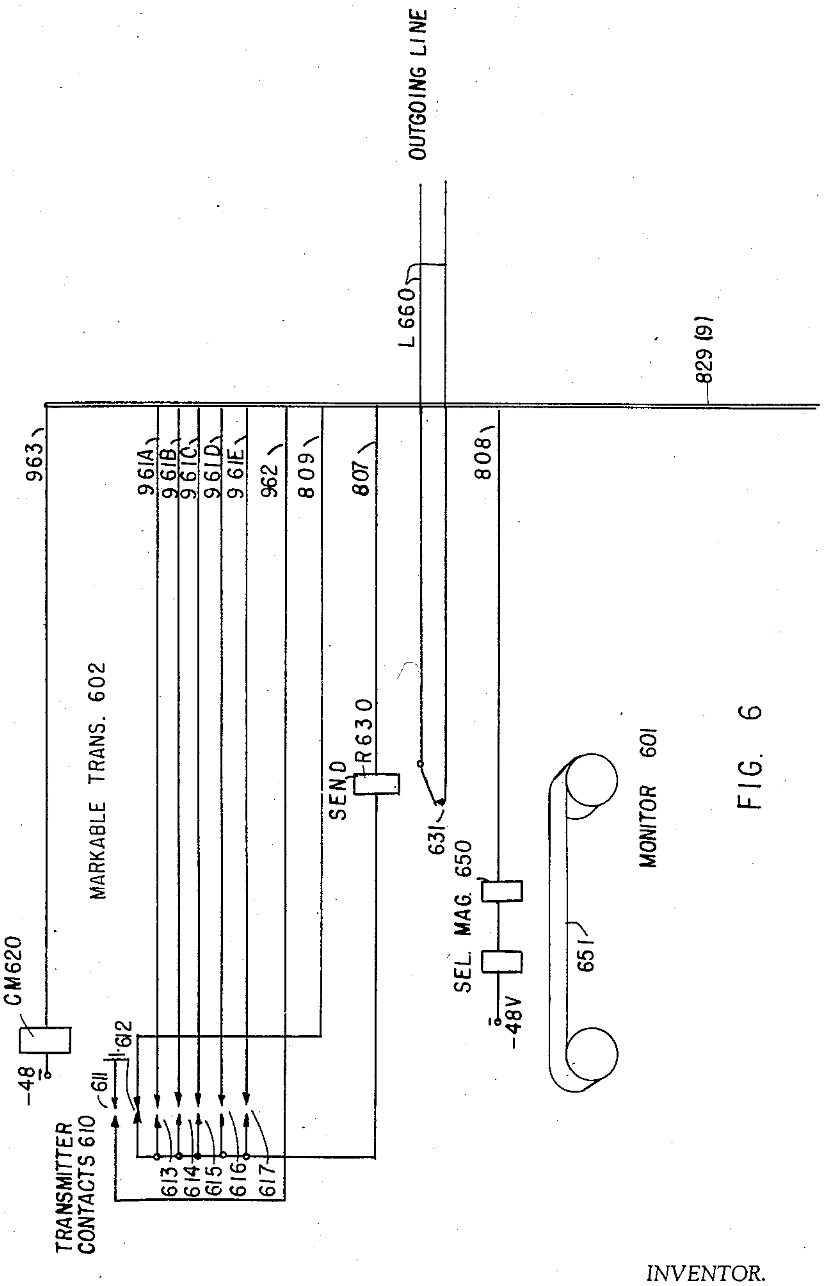

In Fig. 6, there is illustrated a monitor unit 601 and a markable transmitter 602 both of which are individual to the outgoing line L660. The monitor unit 601 includes a monitor tape 651 and a set of selector magnets 650 which are selectively operative for perforating the tape. The markable transmitter 602 includes a set of transmitter contacts 610, a clutch magnet CM620 for operating the set of contacts 610 and a send relay R630 which is selectively operative to transmit signals over the outgoing line L660.

Figure 7:
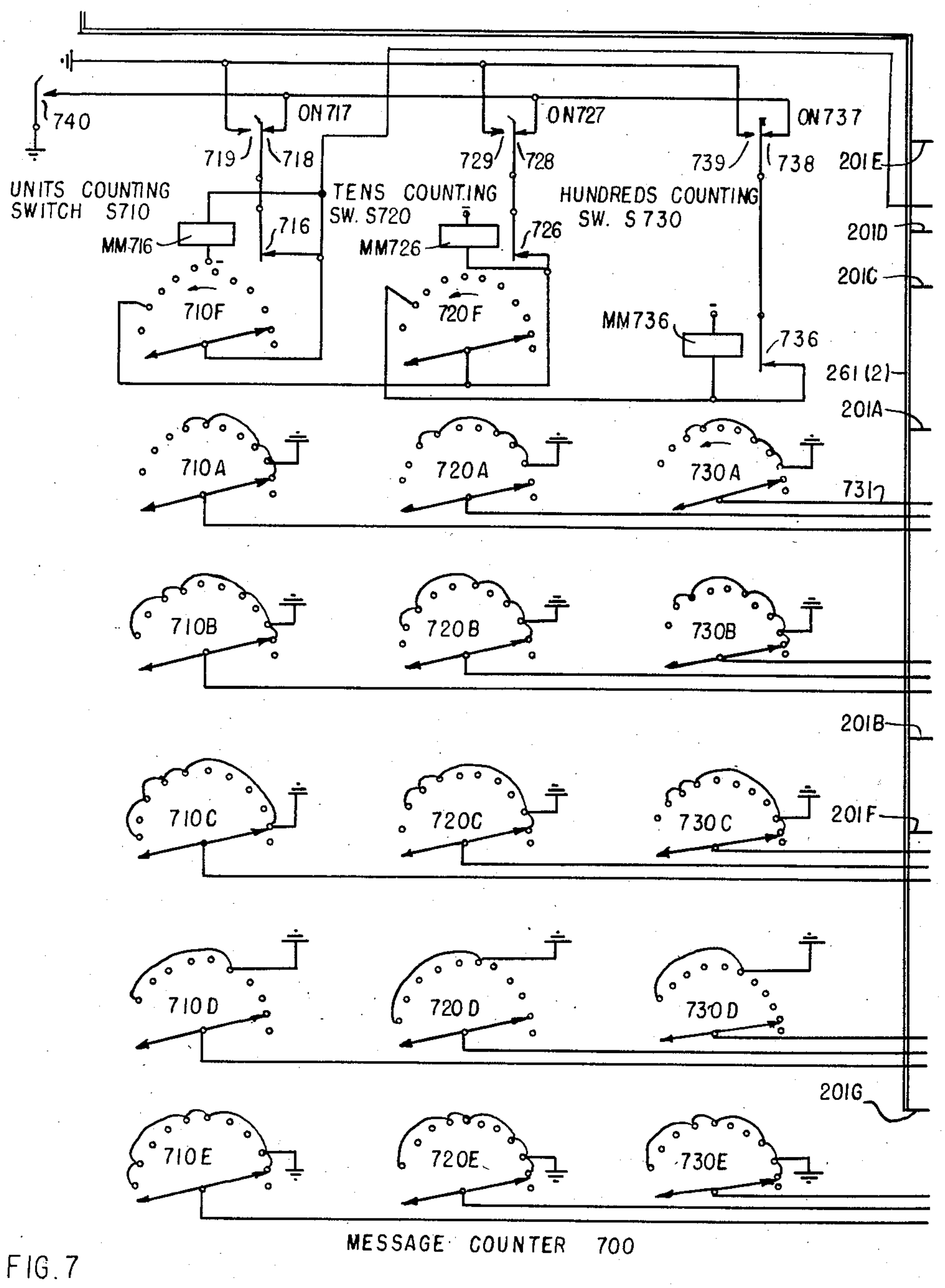
Figure 9:
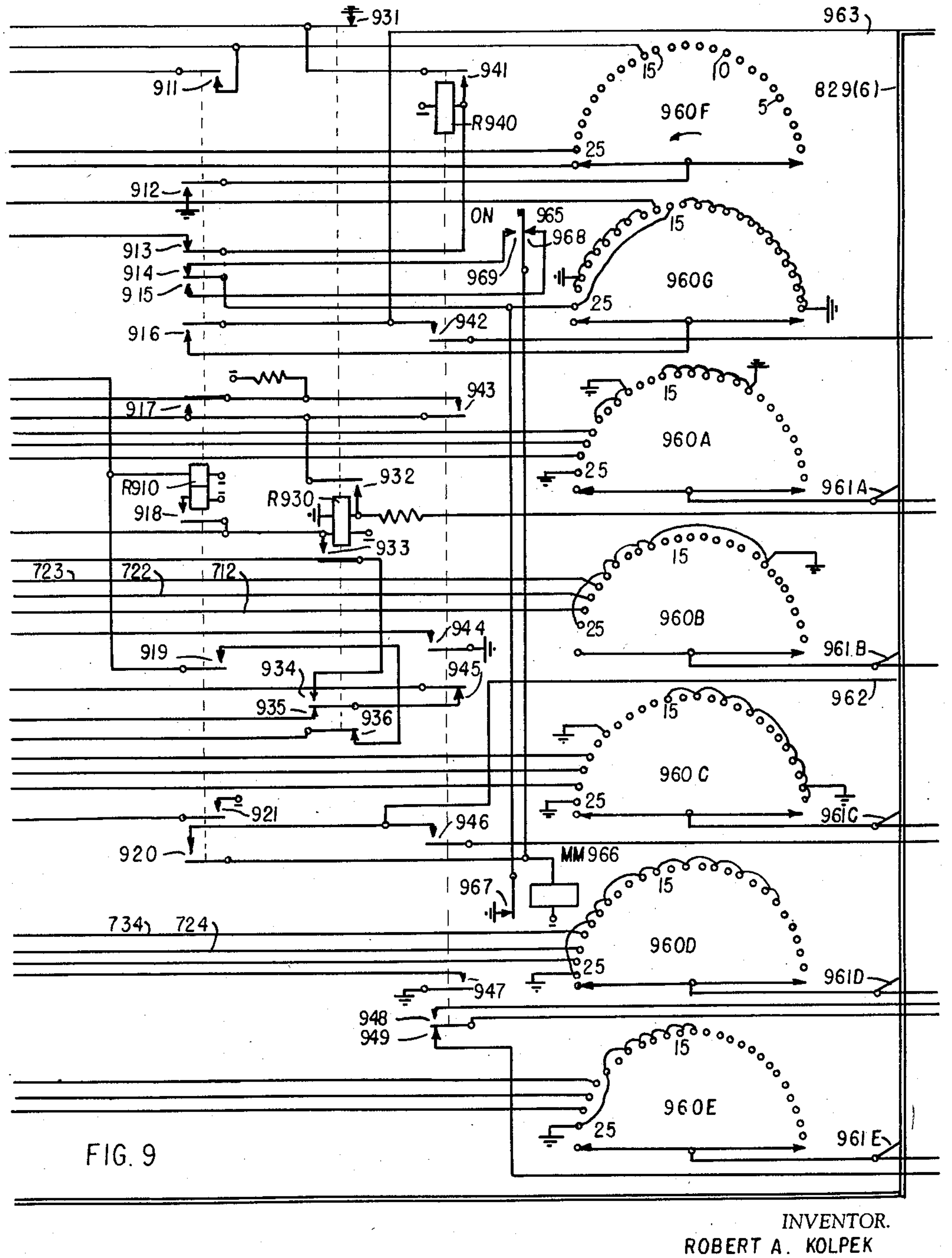
Figure 8:
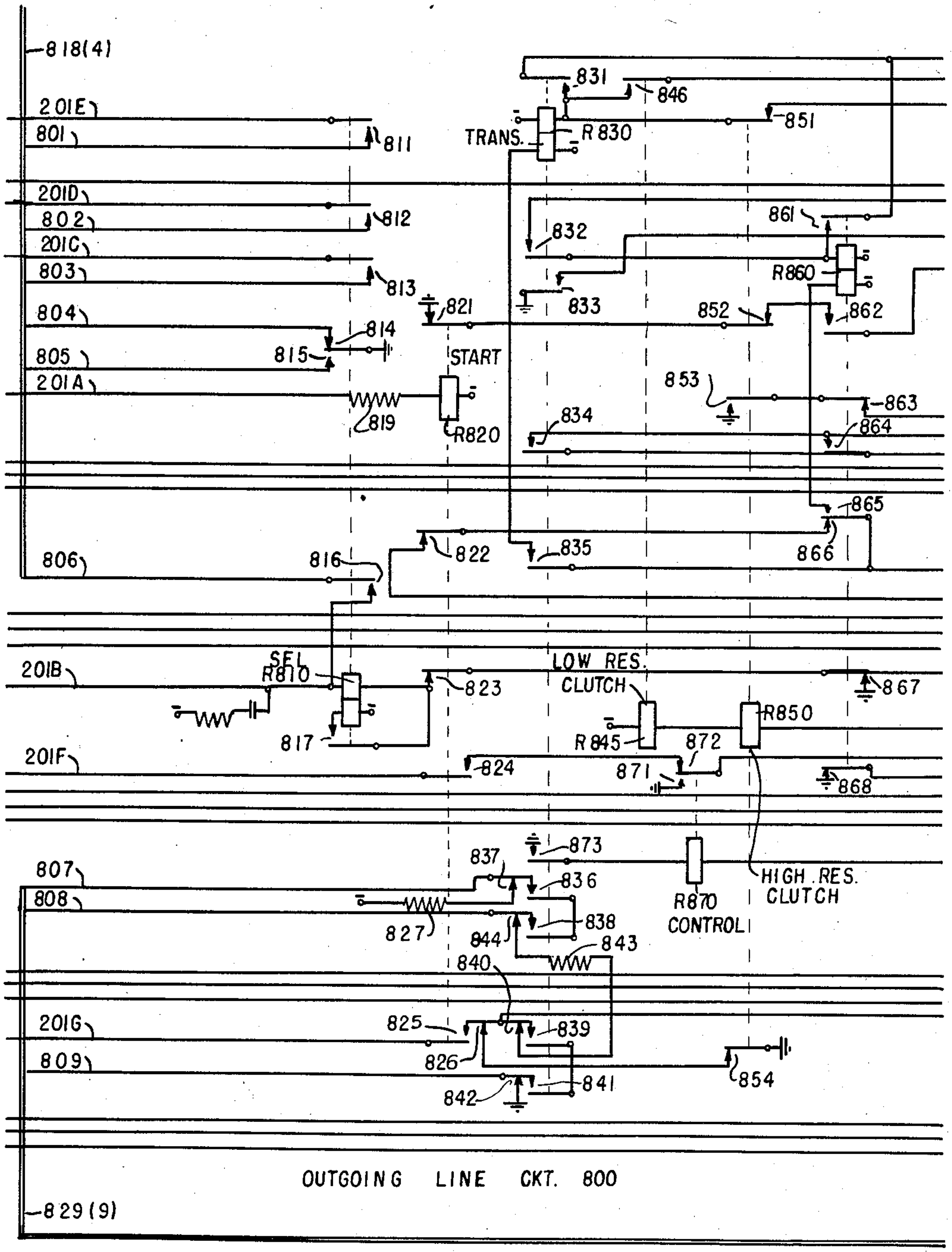
Figure 10:
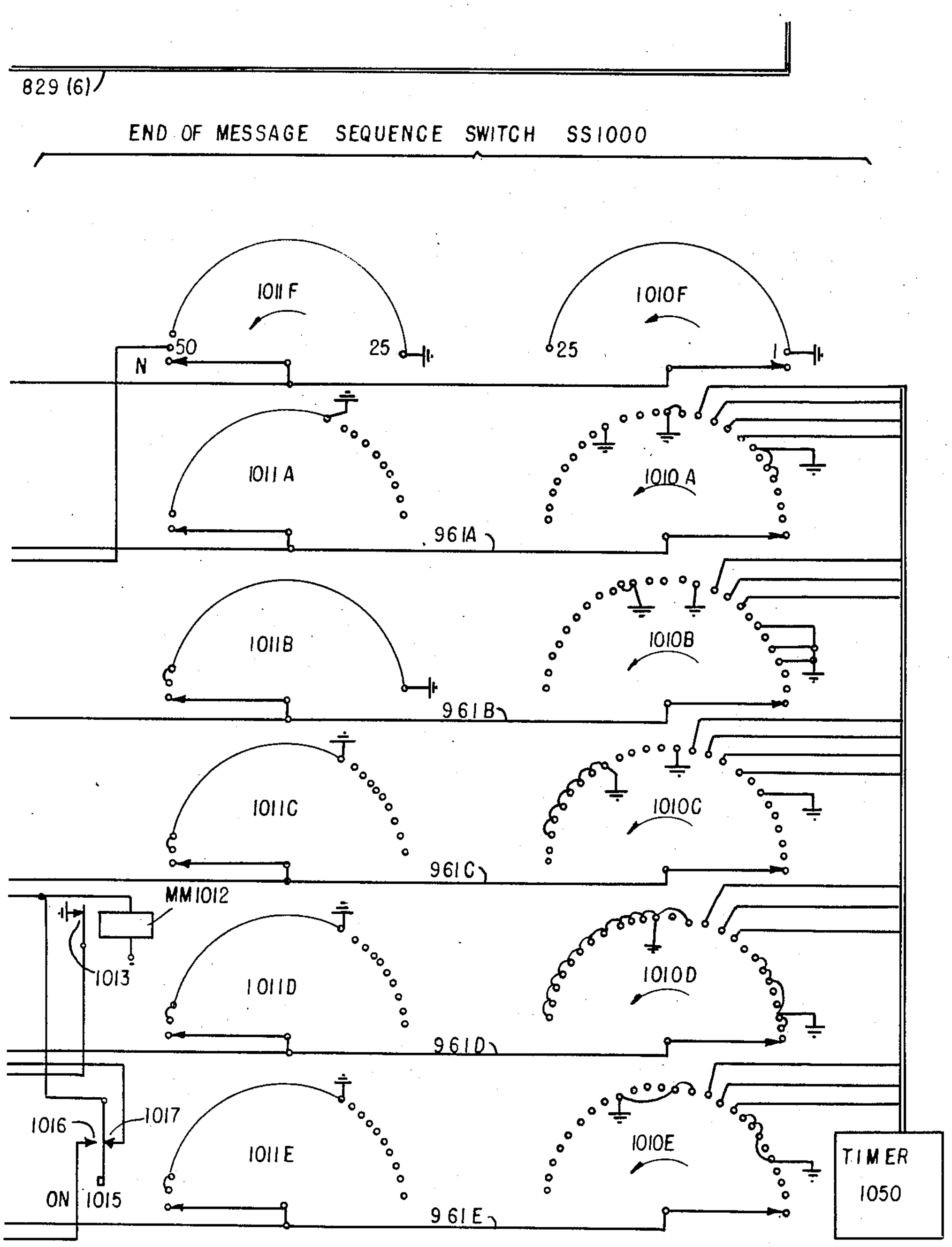

The outgoing line circuit 800 includes a message counter 700 shown in Fig. 7 provided with a units counting switch S710, a tens counting switch S720, and a hundreds counting switch S730 which are selectively operative to count the number of messages transmitted through the outgoing line circuit and to mark the count in the outgoing line circuit. In addition, the outgoing line circuit 800, as shown in Figs. 8, 9 and 10, includes a group of control relays, a start-of-message sequence switch SS960 and an end-of-message sequence switch SS1000. The group of control relays includes a selector relay R810, a start relay R820, a transfer relay R830, a low resistance clutch relay R845, a high resistance clutch relay R850, a start-of-message end relay R860, a start-of-message relay R910, an end-of-message end relay R930, and an end-of-message relay R940. The start-of-message sequence switch SS960 has associated therewith a motor magnet MM966 and includes five wipers and associated banks of contacts particularly adapted to send start-of-message information to the markable transmitter and monitor unit of Fig. 6, a sixth wiper and associated bank of contacts for controlling the stepping operation of the motor maget MM966 and a seventh wiper and associated bank of contacts for performing control operations within the outgoing line circuit 800. The end-of-message sequence switch SS1000 is provided with a motor magnet MM1012, five sets of wipers and associated banks of contacts which are particularly adapted to send end-of-message information to the markable transmitter and monitor unit of Fig. 6, a sixth set of wipers and associated bank of contacts for controlling operation of the motor magnet MM1012, and a seventh set of wipers and associated banks of contacts for performing control operations within the outgoing line circuit 800.

The manner in which the above described apparatus is utilized in the circuits of the invention will better be understood from the consideration of the operation of the equipment in completing a connection from the calling cross-office-unit to a called outgoing line.

*Initial operation of a cross-office unit in marking an outgoing line circuit as called*

Assuming first that the cross-office unit 200 of Fig. 2, has stored therein a telegraph message which is to be transmitted to a remote point via the outgoing line L660 the wipers 202A to 202G, inclusive, of the selector switch S202 are set to engage respectively the conductors 201A to 201G, inclusive, extending via the trunk 261 to the outgoing line circuit 800 associated with the outgoing line L660. In conjunction with the setting of the wipers of the selector switch S202 to engage the conductors extending to the outgoing line circuit 800, the wipers 245A to 254G, inclusive, of the cross-office assigner selector switch S245 are set to engage respectively the conductors 246 and 250 to 255, inclusive, extending via the trunk 260 to the cross-office assigner link 300 which is associated with the outgoing line finder link 400 having access to the group of outgoing line circuits including the outgoing line circuit 800. The setting of the selector switch S245 may be accomplished by stepping the wipers thereof in unison with the stepping of the wipers of the selector switch S202. In this arrangement, assuming that in the outgoing line selector switch S202 the first ten contacts of the banks extend to the individual outgoing line circuits of Group No. 1 including the outgoing line circuit 800, the first ten contacts of the cross-office assigner selector switch are strapped to the conductors of the trunk 260 extending to the cross-office assigner link 300 individual to the Group No. 1 of outgoing line circuits. Accordingly, the setting of the selector switches S202 and S245 is accomplished, as previously explained, from the cross-office selector switch 3300X and in a manner as explained in the mentioned Stiles application.

It is assumed further that the wipers 235A to 235C, inclusive, of the precedence switch S235 are set in accordance with the transmission precedence of the message stored in the cross-office unit to indicate on any one of the conductors 201C, 201D and 201E the message precedence to the outgoing line circuit 800. Specifically, and as pointed out previously, the message may have any one of a number of transmission precedences, including NM (deferred), R (routine), P (priority), OP (operational immediate), EM (emergency), and F (flash), named in the order proceeding the lowest precedence to the highest precedence rating. For purposes of illustration the wipers of the precedence switch S235 in the cross-office unit 200 have been set to indicate the message stored therein as of a P or priority precedence. In addition, the test relay R3890X in the cross-office unit 200 is at this time operated as explained in detail in the above mentioned Stiles application. Upon operating the relay R3890X closes at contacts 3892X a circuit for extending battery potential via the winding of the test relay R3930X and the wiper 202B of the selector switch S202 to the conductor 201B extending via the trunk 261 to the outgoing line circuit 800.

Assuming further that the outgoing line L660 is at this time idle, the outgoing line circuit 800 associated therewith is in its restored state whereby ground potential is applied to the terminus of the conductor 201B in the outgoing line circuit 800 via the contacts 867 and 823 and the upper winding of the selector relay R810. Accordingly, a circuit is completed from ground potential via the upper high resistance winding of the selector relay R810 in the outgoing line circuit and via the conductor 201B and the winding of the test relay R3930X in the cross-office unit 200 to battery potential. Thereupon the relay R810 is operated but due to the high resistance of the energized winding of relay R810 the relay R3930X is not operated.

In the outgoing line circuit 800 the relay R810 upon operating closes at contacts 817 a circuit from ground potential via the contacts 867 and 823 and the lower winding of the relay R810 to battery potential for maintaining the relay R810 operated, closes contacts 811 for connecting the conductor 201E of the trunk 261 to the conductor 801 in the trunk 818 extending to the outgoing line finder link circuit 400, closes contacts 812 connecting the conductor 201D of the trunk 261 to the conductor 802 of the trunk 818, closes contacts 813 for connecting the conductor 201C of the trunk 261 to the conductor 803 of the trunk 818, closes contacts 815 for applying ground potential to the conductor 805 of the trunk 818, and closes contacts 816 for connecting the conductor 201B of the trunk 261 to the conductor 806 of the trunk 818. At this time then the conductors 201B, 201C, 201D, and 201E extending from the cross-office unit 200 are connected in the outgoing line circuit 800 respectively to the conductors 806, 803, 802, and 801 extending to the outgoing line finder link circuit 400. In addition the conductor 805 extending to the outgoing line finder link circuit 400 has ground potential applied thereto in order to mark the outgoing line circuit as called and to initiate operation of the outgoing line finder link circuit 400. Further operation of the cross-office unit 200 and of the outgoing line circuit 800 is conditioned upon seizure of the outgoing line circuit 800 by the outgoing line finder link circuit 400 and upon seizure of the cross-office unit 200 by the cross-office assigner link 300.

*Operation of the outgoing line finder link and cross-office assigner link in seizing the outgoing circuit to the cross-office unit*

Considering now the operation of the outgoing line finder link circuit 400 in seizing the outgoing line circuit 800, ground potential applied to the conductor 805 in the outgoing line circuit 800 is extended in the outgoing line finder circuit 400 via the conductor 411 and the winding of the start relay 510 to battery potential, whereby the start relay R510 is operated. Upon operating the start relay R510 completes at contacts 511 a circuit extending from the wiper 410A of the selector switch S410 and via the contacts 416, 511 and 523 and the winding of the motor magnet MM415 to battery potential. The contacts of the bank associated with the wiper 410A are connected via conductors, such as the conductor 804, to individual outgoing line circuits, such as the line circuit 800, which conductors normally have ground potential thereon and are otherwise open lines when the associated outgoing line circuits are operated to mark themselves as called. Ground potential applied at the contacts to the wiper 410A is extended over the above traced circuit whereby the motor magnet MM415 is energized to interrupt the circuit at contacts 416, and thereby operate the motor magnet, it being of the operate-upon-release type, so that the wipers of the selector switch S410 are stepped to engage the next set of contacts in the banks. Accordingly, the wiper 410A steps across the contacts of the associated bank until a non-grounded contact is engaged whereupon the operating circuit for the motor magnet MM415 is interrupted.

Assuming that the conductor 804 terminated at the bank associated with the wiper 410A is the first open conductor in the bank, the wipers 410A to 410E, inclusive, engage the set of contacts terminating the conductors extending to the outgoing line circuit 800. During the same interval and in response to the operation of the start relay R510 the circuit for operating the control relay R530 is interrupted at contacts 512 to cause the timer arm 534 associated therewith to start oscillating alternately interrupting and recompleting at the contacts 531 and 532 the operating circuit for the slow-to-release alarm relay R535. In the event that the control relay R530 is not reoperated within a predetermined period the timer arm 534 completely interrupts the operating circuit for the alarm relay R535 whereby a short time thereafter the alarm relay restores and completes at contacts 537 a circuit for indicating faulty operation of the outgoing line finder link circuit 400.

Assuming normal operation of the finder link 400, at the wiper 410B of the selector switch S410 a circuit is completed from ground potential via contacts 525, the wiper 410B, the conductor 806 extending to the outgoing line circuit 800, the contacts 816, the conductor 201B extending via the trunk 261 to the cross-office unit 200, the wiper 202B of the selector switch S202, contacts 3892X and the winding of the relay R3930X to battery potential whereby the relay R3930X operated, and whereby, the upper winding of the selector relay R810 in the outgoing line circuit 800 is shunted by having ground potential applied to both sides of the winding. The relay R810 is maintained operated through its lower winding. In the cross-office unit 200 the relay R3930X upon operating closes at contacts 216 a circuit for extending ground potential via the wiper 245A of the selector switch S245 to the conductor 246 extending via the trunk 260 to the cross-office assigner link 300, and closes at contacts 217 a circuit extending from resistance battery via the wiper 235A of the precedence switch S235, the conductor 237 and the wiper 202D of the selector switch S202, to the conductor 201D extending via the trunk 261 to the outgoing line circuit 800.

In the outgoing line circuit 800 resistance battery on the conductor 201D is extended via contacts 812 and conductor 802 of the trunk 818 to the outgoing line finder link circuit 400, and in the outgoing line finder link circuit 400 resistance battery of −48 volts on the conductor 802 is extended via the wiper 410D of the selector switch SS410 to the windings of the relays R430 and R435, whereby in this circumstance a circuit is completed from −24 volts through the diode D438 and the winding of R435 to the resistance battery so that the relay R435 is operated.

Upon operating the relay R435 completes at the contacts 436 a circuit extending from battery potential via the winding of the comparison relay R540, the contacts 422, 427, and 436 to the conductor 454 extending via the trunk 450 to the cross-office assigner link 300. Further operation of the outgoing line finder link circuit 400 is delayed pending the operation of the cross-office assigner link 300 in seizing the cross-office unit 200.

Reconsidering for a moment the operation of the outgoing line finder link 400 and particularly the operation of the precedence register 419 therein, it is understood that the conductors 201C, 201D, and 201E terminated in the outgoing line circuit 800 and connected therein respectively to the conductors 803, 802 and 801 extending to the outgoing line finder link circuit 400, extend not only to the cross-office unit 200 but to all cross-office units having access to the outgoing line circuit 800 and at any one time it is possible for each of the conductors 201C, 201D and 201E to be marked with ground potential, or resistance battery indicating different transmission preferences for the messages stored in the cross-office units. In this circumstance the precedence register 419, will operate to mark out to the cross-office assigner link the one of the different transmission precedences marked thereto that is of the highest order. Specifically, assuming that there are three cross-office units which are calling to the outgoing line circuit 800 and that the telegraph messages stored in the cross-office units are respectively of a flash precedence, emergency precedence, and operational precedence, the two cross-office units having the flash precedence and emergency precedence messages will attempt to mark the conductor 201C with both ground potential and resistance battery and the other cross-office unit will mark the conductor 201D with ground potential. As between the two cross-office units having the flash precedence and the emergency precedence messages therein a circuit is completed from ground potential in the former cross-office unit to resistance battery in the latter cross-office unit via the conductor 201C and the total voltage drop is experienced across the resistor 223 in the latter cross-office unit so that the conductor 201C is marked only with ground potential. Accordingly, when the conductors 201C and 201D are both marked with ground potential which is extended via the conductor 803 and 802, respectively, to the outgoing line finder link circuit 400. In the outgoing line finder link circuit 400 ground potential on the conductors 802 and 803 will cause the relays R420 and R430 in the precedence register 419 to be operated and due to the arrangement of the group of contacts associated with the relays of the precedence register 419 only the flash precedence conductor 451 will have battery potential marked thereon thereby indicating a flash precedence message to be the highest precedence marked to the outgoing line finder link.

Considering now the operation of the cross-office assigner link 300 in seizing the calling cross-office unit and assuming, in accordance with the arrangement shown in the drawings, that the conductor 454 extending thereto from the outgoing line finder link circuit 400 has battery potential thereon, thereby indicating a priority precedence message to be the highest of the precedences marked, that the conductor 246 extending from the cross-office unit 200 via the trunk 260 has battery potential thereon thereby marking the cross-office unit as calling, and that the conductor 252 extending from the cross-office unit 200 via the trunk 260 has ground potential thereon thereby indicating a message of priority precedence stored therein; a circuit is completed in the cross-office assigner link 300 from ground potential on the conductor 246 via the conductor 320, the contacts 342 and 312, and the winding of the motor magnet MM311 to battery potential whereupon the motor magnet MM311 is energized to interrupt the energizing circuit at the contacts 312 and is thereupon operated to step the wipers of the selector switch S310 in the counterclockwise direction to engage the next contacts in the associated banks of contacts. Upon operating the motor magnet MM311 closes contacts 312 to recomplete the operating circuit for the motor magnet.

Accordingly, operation of the motor magnet MM311 in stepping the wipers of the selector switch S310 continues until the wiper 310A thereof engages the contact terminating a conductor having ground potential thereon, such as the conductor 246, whereupon a circuit is completed from ground potential on the conductor 246 via the wiper 310A, the winding of the connect relay R330, contacts 341 and the winding of the motor magnet MM311 to battery potential whereupon the connect relay R330 and the motor magnet MM311 are energized in series. The relay R330 operates but the motor magnet MM311 does not operate inasmuch as it is of the operate-upon-release type.

Upon operating the relay R330 closes contacts 331 to 338, inclusive, thereby preparing at the contact 331 a circuit for operating the release relay R340 and completing at contacts 335 a circuit for extending battery potential marked on the conductor 454 from the outgoing line finder link 400 to the cross-office unit 200. Specifically, battery potential on the conductor 454 is extended via the contacts 335, the wiper 310E of the selector switch S310, the conductor 252 of the trunk 260, the wiper 245D of the cross-office assigner selector switch S245 in the cross-office unit 200, the wiper 235C of the precedence switch S235 and the winding of the marking relay R225 to ground potential. Thereupon the comparison relay R540 in the outgoing line finder circuit 400 is operated in series with the marking relay R225 in the cross-office unit 200 over the circuit including the conductor 454. At this time the cross-office assigner link 300 is seized to a cross-office unit and specifically to the cross-office unit 200 in Group No. 1 which is calling to the outgoing line circuit 800 and which has a message transmission precedence marked therein corresponding to the transmission precedence registered in the outgoing line finder link 400, and this condition of seizure is indicated in the outgoing line finder link 400 by the operation of the comparison relay R540 therein and is indicated in the cross-office unit 200 by the operation of the marking relay R225 therein.

In the outgoing line finder link 400, the relay R540 upon operating completes at contacts 541 a circuit from ground potential extending via the upper winding of the operate relay R520 to battery potential whereby the relay R520 is operated, applies at the contacts 542 a multiple ground to the conductor 806 extending to the outgoing line circuit 800, and completes at the contacts 543 a circuit for extending ground potential via the conductor 346 of the trunk 450 to the cross-office assigner link 300 through the winding of relay R340 and contacts 331 to battery potential for operating the release relay R340 therein. In the outgoing line finder link 400, the consequent operation of the relay R520 closes at contacts 521 a hold circuit therefor from battery potential via the upper winding thereof, conductor 345 of the trunk 450 extending to the cross-office assigner link 300 and the contact 338 therein to ground potential. In addition, the relay R520 interrupts at the contacts 523 a point in the circuit for operating the motor magnet MM415, closes at contacts 524 an obvious circuit for reoperating the control relay R530 to prevent the restoring of the alarm relay R535 and at contacts 525 removes one of the multiple grounds from the conductor 806. Before considering the consequent operation of the release relay R340 in the cross-office assigner link 300, which controls release of the cross-office assigner link 300 and the outgoing line finder link 400 from the seized cross-office unit and seized outgoing line circuit, it is best to consider the operation of the cross-office unit 200 in response to the operation of the marking relay R225 in series with the comparison relay R540.

In the cross-office unit 200 the operated marking relay R225 completes at conctacts 226 a circuit from battery potential on the wiper 235C through the winding of the auxiliary marking relay R230 to ground potential, whereupon the relay R230 is operated. Upon operating the relay R230 completes at the contacts 231 a circuit extending from ground potential via the contacts 241 and 231, the winding of the slave relay R220, the wiper 202A of the outgoing line selector switch S202 and the conductor 201A extending via the trunk 261 to the outgoing line circuit 800. Ground potential on the conductor 201A at the outgoing line circuit 800 is extended through the resistor 819 and the winding of the start relay R820 to battery potential whereby the slave relay R220 of the cross-office unit 200 is operated in series with the relay R820 of the outgoing line circuit. The relay R220 upon operating closes at contacts 222 a circuit for by-passing the contacts 231 whereby the relays R220 and R820 are maintained operated irrespective of the operational state of the auxiliary marking relay R230 in the cross-office unit. At this time, the cross-office unit 200 is seized to the outgoing line circuit 800 whereupon the cross-office assigner link 300 and the outgoing line finder link 400 may be released from their connections. Release is facilitated in the outgoing line circuit 800 by the operation of the relay R820 in opening at contacts 823 the circuit for maintaining the relay R810 operated through the lower winding thereof whereby contacts 811, 812, 813, 815 and 816 are opened to interrupt in the outgoing line circuit the connection from the calling cross-office units to the outgoing line finder link and to cause the start relay R510 in the outgoing line finder link to restore.

*Release of cross-office assigner link and outgoing line finder link*

Considering release of the cross-office assigner link 300 and the outgoing line finder link 400, it is recalled that at the time of seizure between the cross-office unit and the outgoing line circuit, the outgoing line finder link 400 has operated the start relay R510, the operate relay R520 and the comparison relay R540 and that the start relay R510 is restored shortly thereafter when ground potential is removed from the conductor 805 in the outgoing line circuit. Also at this time the cross-office assigner link 300 has the connect relay R330 operated and the motor magnet MM311 is energized but not operated and the release relay R340 being of the slow-to-operate type is operated a short time thereafter as a consequence the operation of the comparison relay R540. In response to the operation of the release relay R340 the contacts 341 are opened to restore relay R330 and to operate the motor magnet MM311 to step the wipers of the selector switch S310 from the engaged contacts, the contacts 342 are opened for disconnecting the start conductor 320 from the motor magnet and contacts 343 are closed for applying ground potential to the conductor 345 extending to the outgoing line finder link 400. When the wipers of the selector switch S310 are stepped from the engaged contacts the circuit for operating the relays R225 and R230 of the cross-office unit in series with the comparison relay R540 of the outgoing line finder link 400 via the conductor 454 is interrupted so that the named relays restore. At the same time that the motor magnet is operated the connect relay R330 restores to open contacts 331 to 338, inclusive, and thereby interrupting at contacts 331 the operating circuit for the release relay R340. Shortly thereafter the relay R340 restores and opens contacts 343 for removing ground potential from the conductor 345 over which the operate relay R520 in the outgoing line finder link 400 is operated so that R520 restores. These restoring operations take place during the interval that the cross-office unit is being seized to the outgoing line circuit so that at approximately the same time that the operate relay R520 is restored, the start relay R510 is restored by the removal of ground potential from the conductor 805 in the outgoing line circuit 800 and the operated precedence register relay R435 is restored by interruption of contacts 812 in the outgoing line circuit 800. Accordingly, all of the relays in the cross-office assigner link 300 and the outgoing line finder link 400 are restored to normal, ground potential is applied to the wiper 410A of the selector switch S410 by the conductor 804 so that at this time the cross-office assigner link 300 and the outgoing line finder link 400 are idle and ready to be operated respectively by associated calling cross-office units and by associated called outgoing line circuits. Additionally, at this time the relays R3930X and R225 and R230 in the cross-office unit 200 are restored, the former relay by the removal of ground potential from the conductor 201B at the contacts 816 in the outgoing line circuit and the latter two relays by the release of the cross-office assigner link 300 from the trunk 260 extending from the cross-office unit. Further operation of the cross-office unit 200 and outgoing line circuit 800 is directed to transmitting telegraph signals corresponding to the telegraph message stored in the cross-office unit 200 over the outgoing line L660.

*Operation of the cross-office unit and outgoing line circuit in transmitting the telegraph message*

As is described in detail in the previously mentioned Stiles application, Serial No. 260,854, filed December 10, 1954, the cross-office unit is at this time operated with the clutch magnet M3425X restored and the cross-office tape, having the telegraph message perforated thereon, in position with regard to the transmitter sensing contacts 3490X thereof so that the start-of-message indication thereon is advanced beyond the contacts 3490X and the channel or incoming line identification characters thereon preceding the body of the telegraph message on the tape are positioned immediately in front of the sensing contacts 3490X and will be transmitted when the clutch magnet M3425X is again operated.

Considering first the operation of the outgoing line circuit 800 in furthering the transmission of the stored telegraph message, the relay R820 therein, which was operated in response to seizure of the outgoing line circuit by the cross-office unit 200, in addition to opening contacts 823 for restoring relay R810 closes at contacts 824 a circuit extending from battery potential via the low resistance clutch relay R845 and the series connected high resistance clutch relay R850, contacts 945, 935, and 824, the conductor 201F of the trunk 261 extending to the cross-office unit 200, the wiper 202F of the outgoing line selector switch S202 and the winding of the clutch magnet M3425X to ground potential, whereupon the relays R845, R850 and the magnet M3425X are energized in series and the relay R845 and the magnet M3425X are operated, the relay R850 being operated a short period thereafter inasmuch as it is of a high resistance type.

Additionally, the operated start relay R820 closes contacts 825 and opens contacts 826 for completing a connection from the sensing contacts M3490X in the cross-office unit via the wiper 202G of the selector switch S202, the conductor 201G extending via the trunk 261 to the outgoing line circuit 800, the contacts 825 and 840, the resistance 843, the contacts 844 to the conductor 808 extending via the trunk 829 to the monitor unit 601, and the selector magnets 650 to battery potential. Accordingly, the selector magnet 650 in the monitor unit 601 is prepared to perforate the tape 651 in accordance with the incoming line identity characters stored in the cross-office unit 200 as sensed by the sensing contacts 3490X under control of the clutch magnet M3425X.

The clutch relay R850 in the outgoing line circuit 800 upon operating closes at contacts 853 a circuit for operating the start-of-message relay R910 from ground potential via the contacts 853 and 863 and the upper winding of the relay R910 to battery potential. The relay R910 upon operating closes at contacts 915 a circuit extending from ground potential via the contacts 967, 915, 968 of the off-normal switch ON965 and the winding of motor magnet MM966 to battery potential whereupon the motor magnet MM966 is energized to open contacts 967 thereby interrupting the energizing circuit therefor and is operated to step the wipers of the sequence switch SS960 from the home position to the first set of contacts in the banks associated therewith. Additionally, the relay R910 closes contacts 916 for completing a circuit extending from the wiper 960G of the sequence switch SS960 to the conductor 963 extending via the trunk 829 to the markable transmitter 602 and therein through the winding of the clutch magnet CM620 to battery potential, whereby the magnet CM620 is operated when the wiper 960G engages a contact having ground potential thereon. Further, the operated relay R910 closes contacts 919 for completing a hold circuit therefor from ground potential via the contacts 868, 936 and 919, and closes contacts 920 for completing a circuit from battery potential via the winding of the motor magnet MM966, the contacts 920, the conductor 962 extending via the trunk 829 to the markable transmitter 602 to the individual contacts 611 of the set of transmitter contacts 610.

Considering for a moment the cooperative operating arrangement between the set of transmitter contacts 610 in the markable transmitter 602 and certain of the banks of contacts in the start-of-message sequence switch SS960 in the outgoing line circuit 800, the set of transmitter contacts 610 includes seven individual contacts 611 to 617, inclusive, of which the contacts 611 and 613 to 617, inclusive, are normally opened and the contacts 612 are normally closed. The set of contacts are operated from the clutch magnet CM620 through continuous cycles wherein during each cycle the normally closed contacts 612 are opened and the normally opened contacts 611 are closed during the period of the cycle and wherein the contacts 613 to 617, inclusive, are closed and opened one at a time and consecutively during the period of the reading cycle. The individual contacts 611 upon closing complete a connection from ground potential to the conductor 962 of the trunk 829, and the contacts 612 upon opening interrupt a connection between the conductor 809 of the trunk 829 and one terminal of the winding of the send relay R630. Additionally, the contacts 613 to 617, inclusive, upon closing complete connections from the conductors 961A to 961E, inclusive, respectively, of the trunk 829, to the one mentioned terminal of the winding of the send relay R630.

In the outgoing line circuit 800 the conductors 961A to 961E, inclusive, of the trunk 829 are terminated respectively at the wipers 960A to 960E, inclusive, of the start-of-message sequence switch SS960. Each of the banks associated with the wipers 960A to 960E, inclusive, include 25 contacts and are connected to ground potential in accordance with the standard telegraph code shown in Fig. 12, to transmit to the markable transmitter certain information as shown in Fig. 13, including a start-of-message designation, letters identifying the outgoing line circuit, and numerals corresponding to a count of the messages transmitted during a given transmission period over the outgoing line L660. A wiper 960F is associated with the sequence switch SS960 for the purpose of selectively operating certain of the relays in the outgoing line circuit 800, and the wiper 960G which, as previously pointed out, is connected to the conductor 963 of the trunk 829 for the purpose of controlling operation of a clutch magnet CM620 in the markable transmitter 602.

Considering now operation of the markable transmitter 602 from the outgoing line circuit 800, ground potential applied to the conductor 809 at the contacts 842 is extended via the trunk 829 to the markable transmitter 602, through the normally closed individual contacts 612 thereof, the winding of the send relay R630, and via the conductor 807 of the trunk 829 to the outgoing line circuit 800 and through the contacts 837 to resistance battery whereby the send relay R630 is normally operated. However, when the clutch magnet CM620 is operated from ground potential by the wiper 960G of the sequence switch SS960 being stepped from its home position into engagement with the first of its contacts, the set of transmitter contacts 610 in the markable transmitter 602 are operated in a manner as previously explained to cause the send relay to restore and to be thereafter selectively operated and restored from ground potential marked to the conductors 961A to 961E, inclusive, by the wipers 960A to 960E, inclusive, of the sequence switch SS960. Accordingly, as the wipers of the sequence switch SS960 are stepped across the first 15 contacts thereof the first 15 characters listed under column SS960, of Fig. 13, are transmitted over the outgoing line L660 and during the same period the selector magnets 650 of the monitor unit 601 are operated from the sensing contacts 3490X in the cross-office unit 800 over the previously traced path to perforate the tape 651 with identity information regarding the incoming line over which the telegraph message was received in the switching center.

At the end of this period the tape in the cross-office unit 200 is advanced so that the body of the telegraph message is immediate to the sensing contacts 3490X, and the wipers of the sequence switch SS960 are advanced into engagement with the 16th contacts in the associated banks whereupon ground potential for operating the clutch magnet CM620 in the markable transmitter 602 is removed from the conductor 963 at the wiper 960G. At the same time the wiper 960F of the sequence switch CC960 completes a circuit from ground potential via the contacts 912, the wiper 960F, the 16th contact of the associated contact bank, the contacts 846, and the upper winding of the transfer relay R830 to battery potential, whereupon the last named relay is operated. Upon operating the transfer relay R830 closes at contacts 831 a hold circuit for itself from ground potential via the contacts 931 and completes at contacts 873 a circuit for operating the control relay R870 from ground potential via contacts 873, the winding of R870 and contacts 921, whereby contacts 871 are closed to maintain relays R845 and R850 operated and contacts 872 are opened to remove operating battery from the conductor 201F extending to the clutch magnet M3425X in the cross-office unit 200 so that the sensing action of the sensing contacts 3490X therein is terminated.

Additionally, the transfer relay R830 upon operating closes contacts 836, 838, 839 and 841, and opens contacts 837, 844, 840 and 842 thereby disconnecting the monitor unit 601 from the sensing contacts 3490X in the cross-office unit 200 and connecting the monitor unit 601 in series with the send relay R630 and the markable transmitter 602 to the sensing contacts 3490X. Specifically, a circuit is completed from battery potential via the selector magnet 650 in the monitor unit 601, the conductor 808 of the trunk 829 extending to the outgoing line circuit 800, the contacts 838 and 836, the conductor 807 of the trunk 829 extending to the markable transmitter 602, the winding of the send relay R630, the normally closed contacts 612 of the transmitter contact set 610, the conductor 809 of the trunk 829 extending to the outgoing line circuit 800, the contacts 841, 839 and 825, the conductor 201G of the trunk 261 extending to the cross-office unit 200, the wiper 202G of the selector switch S202, and to ground potential via the set of contacts 3490X. Further, the relay R830 upon operating closes contacts 833 for extending ground potential to the wiper 960G of the sequence switch SS960. Thus at this time the identity information recorded on the tape in the cross-office unit 200 has been transferred to the monitor unit tape 651 in the monitor unit 601 and the outgoing line L660 has had transmitted thereover the start-of-message designation, whereupon transmission in the cross-office unit 200, is interrupted and the monitor unit 601 is connected in series with the markable transmitter 602 and the send relay R630 so that the outgoing line circuit identity signals and the message count number may be simultaneously transmitted over the outgoing line L680 and perforated in the tape 651 of the monitor unit 601.

Considering now the operation of the outgoing line circuit 800 to cause the outgoing line circuit identity characters and the message count numbers to be sent over the outgoing line and recorded on tape of the monitor unit 601, as previously pointed out, the relay R830 upon operating closes at contacts 833 a circuit for extending ground potential to the wiper 960G of the sequence switch SS960, which ground potential is extended over the conductor 963 to the markable transmitter 602 causing the clutch magnet CM620 therein to be operated. The wipers of the sequence SS960 then step consecutively from the 16th contact through the 21st contact in a manner as previously explained to cause the outgoing line circuit identity characters listed for the 16th to 21st switch points inclusive, under the column SS960 of Fig. 13, to be transmitted over the outgoing line L660 and to be perforated in the tape 651 of the monitor unit 601.

Thereafter numerals corresponding to the message count registered in the outgoing line circuit 800 are transmitted via the wipers of the sequence switch SS960. Specifically, when the wipers 960A to 960E, inclusive, are stepped from the 21st contacts to engage the 22nd contacts of the associated contact banks, connections are completed thereover, respectively, to the wipers 730A to 730E, inclusive, of the hundreds counting switch S730 whereby the number marked therein is transmitted to the markable transmitter 602. Thereafter, the wipers 960A to 960E, inclusive, of the sequence switch SS960 engage the 23rd, contacts of the associated banks thereby completing connections respectively to the wipers 720A to 720E, inclusive, of the tens counting switch S720 whereby the number marked therein is transmitted to the markable transmitter 602. Thereafter, when the wipers 960A to 960E, inclusive, engage the 24th contacts in the associated contact banks connections are completed respectively to the wipers 710A to 710E, inclusive, of the units counting switch S710, whereby the number marked therein is transmitted to the markable transmitter 602. When the wipers of the sequence switch SS960 engage the 25th contacts in the associated contact bank a circuit is completed from ground potential via the contacts 912, the wiper 960F, the 25th contact of the associated contact bank and the winding of the motor magnet MM716 to battery potential whereby the motor magnet MM716 is energized and is operated thereafter, when the circuit is interrupted by the wipers of the sequence switch SS960 stepping from the 25th contact to the home position, so that the wipers 710A to 710F, inclusive, of the units counting switch S710 are stepped in a counter-clockwise direction to engage the next contact in the associated banks. At the same time, when the wipers of the sequence switch SS960 step from the 25th contact to their home position, a circuit is completed from ground potential via contacts 912, the wiper 960F, the home contact of the associated contact bank, contacts 832 and the upper winding of the start-of-message end relay R860 to battery potential whereupon the relay R860 is operated to indicate in the outgoing line circuit 800 that the operation of the sequence switch SS960 is completed.

Referring for a moment to the operation of the counting switches S710, S720 and S730, it is understood that when the wipers of the units counting switch S710 is stepped into engagement with the 9th contact thereof a circuit is completed for energizing the motor magnet MM726 associated with the tens counting switch S720, which motor magnet is operated when the wiper 710F is stepped from the 9th contact associated therewith to the 10th contact whereupon the wipers of the tens counting switch S720 is stepped in a counter-clockwise direction to engage the next contacts in the associated contact banks. The wiper 720F of the tens counting switch S720 performs the same control operation with regard to the motor magnet MM736 of the hundreds counting switch S730 at the 10th contact positon thereof, so that the wipers of the units counting switch S710 are stepped through ten contact positions for each contact position that the wipers of the tens counting switch S720 are stepped, the wipers of the tens counting switch S720 are stepped through ten contact positions for each contact position that the wipers of the hundreds counting switch S730 are stepped, thereby to register a count of the number of messages transmitted over the outgoing line.

Referring again to the operation of the outgoing line circuit 800, in response to the operation of the start-of-message end relay R860 an obvious hold circuit is completed therefor at the contacts 861 and the operating circuits for the start-of-message relay R910 are interrupted at the contacts 863 and 868, whereby the latter relay restores. Upon restoring the relay R910 interrupts at contacts 916 and 920 the connections between the markable transmitter 602 and the start-of-message sequence switch SS960, and interrupts at the contacts 921 the circuit for maintaining the control relay R870 operated. Thereafter, the relay R870 restores and again completes at the contacts 872 the circuit for operating the clutch magnet M3425X of the cross-office unit 200 in series with the low resistance and high resistance clutch relays R845 and R850 of the outgoing line circuit 800. Thereupon the cross-office unit 200 and the outgoing line circuit 800 are prepared to cause the body of the telegraph message stored in cross-office unit 200 to be transmitted over the outgoing line L660 and to be perforated on the tape 651 of the monitor unit 601.

Recapitulating for a moment, it is clear from the foregoing that at this time the tape 651 of the monitor unit 601 has recorded therein incoming line identity information transferred thereto from the tape in the cross-office unit 200, the outgoing line identification letters and the message count numerals, and the outgoing line L660 has had transmitted thereover the start-of-message letters, the outgoing line identity letters, and the message count numerals. Accordingly, processing of the message has advanced to the state that the circuits are prepared to transmit over the outgoing line L660, and to record in the tape 651 of the monitor unit 601 the characters in the body of the telegraph message which are recorded on the tape in the cross-office unit 200.

Considering now the operation of the cross-office unit 200 and the outgoing line circuit 800 in transmitting the characters of the telegraph message over the outgoing line L660, it is assumed that at this time the tape in the cross-office unit is advanced through the sensing contacts 3490X so that the contacts are prepared to sense the characters in the body of the telegraph message. Accordingly, when the clutch magnet M3425X in the cross-office unit 200 is again operated in series with the clutch relays R845 and R850, the sensing contacts 3490X are operated to cause ground pulses corresponding to the characters in the body of the telegraph message to be transmitted over the conductor 201G of the trunk 261 to the outgoing line circuit 800, the previously traced series connection including the conductor 809 of the trunk 829, the individual contacts 612 of the set of transmitter contacts 610 in the markable transmitter 602, the winding of the send relay R630, the conductor 807 of the trunk 829 extending to the outgoing line circuit 800, and the conductor 808 of the trunk 829 extending through magnet 650 to battery potential in the monitor unit 601. Accordingly, the send relay R630 and the selector magnet 650 are operated in series in accordance with the ground pulses transmitted from the set of sensing contacts 3490X whereby the characters in the body of the telegraph message are transmitted over the outgoing line L660 and are perforated in the tape 651 of the monitor unit 601. In this manner the set of contacts 3490X in the cross-office unit 200 continues to read and transmit ground pulses corresponding to the characters in the body of the telegraph message until the end-of-message designation is detected in the tape reader thereof and for the predetermined number of reading cycles thereafter required to permit all of the characters in the body of the telegraph message to be transmitted over the conductor 201G. Thereupon the control relay R3830X is operated in the manner as explained in the above mentioned Stiles application to interrupt at contacts 241 the circuit for maintaining the slave relay R220 of the cross-office unit 200 operated in series with the start relay R820 of the outgoing line circuit 800 whereupon the slave relay R220 and the start relay R820 restore.

At this time then, operation of the cross-office unit 200 in transmitting the message stored therein over the outgoing line L660 is completed, the test relay R3890X therein is restored in a manner as is explained in detail in the copending Stiles application thereby interrupting contacts 3892X to remove battery potential from the conductor 201B of the trunk 261, whereupon the cross-office unit is prepared to be released and will be completely released and restored to normal and prepared to receive therein another telegraph message for transmission over an outgoing line when the connections to the conductors 201F and 201G are interrupted in the outgoing line circuit 800.

*Operation of the outgoing line circuit in releasing the cross-office unit and in transmitting the end-of-message characters*

In the outgoing line circuit 800 the restoration of the start relay R820 interrupts at contacts 824 and 825, respectively, the connections therein to the conductors 201F and 201G extending to the cross-office unit 200 whereby the cross-office unit is completely released and prepared to receive other telegraph messages. The opening of the contacts 824 also interrupts the operating circuit for the clutch magnet relays R845 and R850 whereby the relay R845 restores immediately and the relay R850, it being of high resistance type, restores shortly thereafter. During the period immediately preceding the restoration of the relay R850, the start relay R820 closes at contacts 821 one point in the circuit for operating the end-of-message relay R940 and closes at the contacts 826 one point in this circuit for applying ground potential to the conductor 809 of the trunk 829 extending to the markable transmitter 602. Thereafter, when the relay R850 restores there is completed at the contacts 852 a circuit extending from ground potential via the contacts 821, 852, 862 and 913 and the winding of the relay R940 to battery potential whereby the end-of-message relay R940 is operated, and there is closed at the contacts 854 a circuit extending from ground potential via the contacts 854, 826, 839 and 841, and the conductor 809 of the trunk 829 extending to the markable transmitter 602 to complete the previously traced circuit for operating the send relay R630 therein and the selector magnet 650 in the monitor unit 601 in series. At this time the outgoing line circuit 800 is prepared to cause certain end-of-message information to be transmitted over the outgoing line L660 and to cause the tape 650 of the monitor unit 601 to be perforated in accordance therewith.

The end-of-message relay R940 controls operation of the end-of-message sequence switch SS1000 in applying to the outgoing line L660 and to the selector magnets 650 of the monitor unit 601 telegraph signals in the standard telegraph code of Fig. 12 corresponding to that information shown under column SS1000 in Fig. 13, and including letters corresponding to the outgoing line identity, numerals corresponding to the time of day, and characters corresponding to the end-of-message designation followed by certain line feed and control characters which may be varied to accommodate the telegraph system and the various equipment included in the telegraph system. Before considering the functions of the sequence switch SS1000 it is well to consider the construction of the sequence switch SS1000 and the manner in which the various wipers thereof are connected to the trunk 829 extending to the markable transmitter 602 and to the various relays in the outgoing line circuit 800.

Referring specifically to the end-of-message sequence switch SS1000 there is included therein six pairs of wipers and associated contact banks including the wipers 1010A to 1010F, inclusive, and wipers 1011A to 1011F, inclusive, wherein the wipers having like suffix letters are arranged in pairs. Each bank of contacts includes 25 individual contacts and the wipers of each pair are connected in parallel and are arranged with regards to the associated contacts so that each pair of wipers and associated contact banks effectively comprises a 50 point switch. The wipers 1010A and 1011A are connected in parallel to the conductor 961A of the trunk 829; the wipers 1010B and 1011B are connected in parallel to the conductor 961B of the trunk 829; the wipers 1010C and 1011C are connected in parallel to the conductor 961C of the trunk 829; the wipers 1010D and 1011D are connected in parallel to the conductor 961D of the trunk 829; and the wipers 1010E and 1011E are connected in parallel to the conductor 961D of the trunk 829. The trunk 829, as previously pointed out, extends to the markable transmitter 602 and to corresponding individual contacts in the set of transmitter contacts 610 thereof. The wipers 1010F and 1011F are connected in parallel via the contacts 942 to the conductor 963 of the trunk 829 extending to the clutch magnet CM620 of the markable transmitter 602 for selectively operating the clutch magnet and the set of transmitter contacts 610 associated therewith. The motor magnet MM1012 associated with the sequence switch SS1000 is operated during each reading cycle from the individual contacts 611 of the set of contacts 710 and via the conductor 962 of the trunk 829 in a manner as will be described in detail hereinafter.

Considering now the operation of the outgoing line circuit 800 in transmitting the end-of-message information to the markable transmitter 602, the relay R940 upon operating closes at contacts 948 a circuit extending from ground potential via the contacts 1013 and 948, contacts 1017 of the off-normal switch ON1015 through the winding of the motor magnet MM1012 to battery potential, whereby the motor magnet MM1012 is energized to open the circuit at the contacts 1013 and thereupon is operated to step the wipers 1010A to 1010F, inclusive, of the sequence switch SS1000 one step in the counterclockwise direction to engage the first contacts of the associated contact banks. Thereupon, the contacts 1017 of the off-normal switch ON1015 are closed and the contacts 1016 thereof are opened. At the same time the relay R940 closes contacts 942 for connecting the wipers 1010F and 1011F to the conductor 963 of the trunk 829 through the winding of the motor magnet MM1012 to battery potential, thereby to energize the motor magnet MM1012 during each reading cycle of the transmitter contacts 610 and to operate the motor magnet at the end of each reading cycle. Upon engaging the first contact of the associated bank of contacts the wiper 1010F applies ground potential to the conductor 963 whereby the clutch magnet CM620 and the associated set of transmitter contacts 610 are operated, whereupon a carriage returned character, as noted from Fig. 13, is transmitted over the outgoing line L660 and perforated in the tape 650. At the end of the reading cycle the individual contacts 611 are opened thereby operating the motor magnet MM1012 to step the wipers of the sequence switch SS1000 into engagement with the second contacts in the associated contact banks. In this manner the clutch magnet CM620 and the associated set of transmitter contacts 610 are operated continuously through 49 cycles so that the outgoing line L660 has transmitted thereover and the monitor tape 650 has perforated therein during the 4th, 5th and 6th cycles of operation the letters corresponding to the outgoing line identification, during the 8th, 9th, 19th and 11th cycles of operation the numerals corresponding to the time of the day as applied thereto from the timer unit 1050, and during the 17th to 24th, inclusive, cycles of operation the characters corresponding to the end-of-message designation. During the remainder of the cycles other characters are transmitted for controlling in the remote office the line tape feed apparatus and the teletypewriter reperforator, all in accordance with the schedule under column SS1000 of Fig. 13.

When wipers of the sequence switch SS1000 have been operated through 25 steps, control is shifted from the wipers 1010A to 1010F inclusive, to the wipers 1011A to 1011F, inclusive. When the wiper 1011F steps from the 49th contact into engagement with the 50th contact a circuit is completed from ground potential via the upper winding of the end-of-message end relay R930, the 50th contact of the bank associated with the wiper 1011F, contacts 942, the conductor 963 of the trunk 829 and the winding of the clutch magnet CM620 to battery potential whereby the relay R930 and the clutch magnet CM620 are operated in series. Thereupon the clutch magnet CM620 completes the last operating cycle of the set of transmitter contacts 610 and operates the motor magnet MM1012 to step the wipers of the sequence switch SS1000 from the 50th contact into their home position. At the same time the relay R930 completes at its contacts 932 a circuit for maintaining the relay operated from battery potential via the contacts 943 and 932 to ground potential. With the wipers of he sequence switch SS1000 stored in their home positions the clutch magnet CM620 is rendered inoperative, whereby operation of the motor magnet MM1012 is terminated and contacts 1016 of the off-normal switch ON1015 are interrupted and the contacts 1017 thereof are closed. The closing of the contacts 1017 of the off-normal switch ON1015 prepares the sequence switch SS1000 for a new cycle of operation and the switch would operate but for the restoring of the end-of-message relay R940 at this time as explained below.

During the last operational period of the clutch magnet CM620 the relay R930 opens at contacts 931 the circuits for maintaining the transfer relay R830 and the start-of-message end relay R860 operated, whereby the latter relays restore. Relay A860 upon restoring interrupts at contacts 862 the circuit for maintaining the end-of-message relay R940 operated whereby the latter relay restores to disconnect the conductors 962 and 963 of a trunk 829 extending to the markable transmitter 602 from the sequence switch SS1000 and interrupts at contacts 948 the circuit for initiating operation of the motor magnet MM1012. Additionally, the relay R940 upon restoring interrupts at the contacts 943 the circuit from resistance battery for maintaining the end-of-message end relay R930 operated, whereby the latter relay restores. At this time then, transmission from the outgoing line transmitter circuit 800 over the outgoing line L660 is completed and all of the relays in the outgoing line circuit 800 are restored to normal, whereupon the conductor 807 of the trunk 829 has resistance battery applied thereto at contacts 837, the conductor 808 of the trunk 829 has ground potential applied thereto via the contacts 844, 840, 826 and 854, and the conductor 809 of the trunk 829 has ground potential applied thereto via contacts 842. Accordingly, the send relay R630 in the markable transmitter 602 is maintained operative thereby interrupting at the contacts 631 the line transmission loop circuit and maintaining the selector magnet 650 of the monitor unit 601 energized. Additionally, the conductor 201B extending to the group of cross-office units, including the cross-office unit 200, having access to the outgoing line circuit 800 is marked idle by ground potential applied thereto via the contacts 867 and 823 and the upper winding of the selector relay R810. Thus, the outgoing line circuit 800 is restored to normal is marked as idle to the cross-office units and is prepared to be seized to any calling cross-office unit and to transmit messages therefrom over the outgoing line L660.

*Conclusions*

From the foregoing it will be understood that when a cross-office unit has a message stored therein which is to be transmitted over a particular outgoing line, the outgoing line selector switches thereof are set to engage conductors extending to the outgoing line circuit associated with the outgoing line and the cross-office assigner selector switches are set to engage the conductors extending to the one cross-office assigner link associated with the outgoing line finder link having access to the group of outgoing lines including the called outgoing line. When the outgoing line is idle, the outgoing line circuit to which the calling cross-office unit is connected marks itself as idle to the cross-office unit whereupon both the cross-office unit and the outgoing line circuit are operated respectively to cause the cross-office assigner link to seize the calling cross-office unit and to cause the outgoing line finder to seize the outgoing line circuit associated wth the called outgoing line.

In its line finding operation the outgoing line finder link is operated to register the highest transmission precedence rating of the messages stored in the calling cross-office units and is operated in accordance therewith to cause the cross-office assigner link to seize the first one of the calling cross-office units having a message of the transmission precedence corresponding to that registered in the outgoing line finder link. Thereupon the seized cross-office unit is operated to complete a connection therefrom to the outgoing line circuit associated with the called outgoing line. In response to the completion of a connection the outgoing line circuit is operated to cause start-of-message information to be transmitted over the outgoing line circuit and at the completion of this transmission the outgoing line circuit is further operated to cause the connected cross-office unit to commence transmission of the characters in the body of the telegraph message stored therein. At the end of the transmission of the body of the telegraph message the cross-office unit is prepared to interrupt its connection to the outgoing line circuit and causes the outgoing line circuit to be operated in order to release the connected cross-office unit and to cause end-of-message information to be transmitted over the outgoing line associated therewith. At the end of the transmission of the end-of-message information the outgoing line circuit is restored to normal and marked as idle to the cross-office units having access thereto.

In view of the foregoing, it is apparent that there has been provided an improved arrangement for linking any calling one of a large group of cross-office units with any one of a large number of outgoing lines, wherein the linking arrangement is selective to complete a connection only from the one calling cross-office unit having a message of the highest transmission precedence rating stored therein.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In an automatic telegraph system message center including a plurality of outgoing lines extending to distant stations, a plurality of message storage units each operative to store therein for transmission over any one of said outgoing lines a telegraph message having assigned thereto any one of a number of different transmission precedence ratings and to mark the message storage unit as calling to any one of said outgoing lines and to mark the message storage unit in accordance with the one assigned transmission precedence rating, a plurality of outgoing line circuits corresponding to said outgoing lines each accessible to any one of said message storage units and operative to control transmission of telegraph messages over the corresponding outgoing line, a link having direct access to said message storage units and to said outgoing line circuits, each of said outgoing line circuits being responsive to calling markings extended to the corresponding outgoing line from said message storage units for marking said outgoing line circuit as called to said link and for marking said calling message storage units as calling to said link, means included in said link responsive to a called marking extended thereto from one of said outgoing line circuits for registering the highest of the transmission precedence ratings marked at said calling message storage units and for selecting from said group of calling message storage units an individual one thereof marked in accordance with said highest registered transmission precedence rating, and means included in each of said calling message storage units responsive to the selection thereof by said link for completing a transmission connection therefrom to the corresponding called outgoing line circuit independent of said link.

2. In an automatic telegraph system message center including a plurality of outgoing lines extending to distant stations, a plurality of message storage units each operative to store therein for transmission over one of said outgoing lines a telegraph message having assigned threto any one of a number of different transmission precedence ratings, a plurality of outgoing line circuits corresponding to said outgoing lines each accessible to any one of said message storage units and operative to control transmission of telegraph messages over the corresponding outgoing line, a link having direct access to said outgoing line circuits and to said message storage units, each of said message storage units being responsive to a message stored therein to be transmitted over one of said outgoing lines for marking said message unit as calling to the corresponding outgoing line circuit and for marking said message storage unit in accordance with the transmission precedence rating of the message stored therein, each of said outgoing line circuits being operative responsive to calling markings extended thereto from said message storage units for marking said outgoing line circuit as called to said link and for marking said calling message storage units to said link, means included in said link responsive to a called marking extended thereto from one of said outgoing line circuits for registering the highest of the transmission precedence ratings marked at said calling message storage units and for selecting the one of said message storage units marked in accordance with said highest registered transmission precedence rating and for operating said selected one message storage unit to complete a transmission connection therefrom to said one called outgoing line circuit and for thereafter restoring said link.

3. In an automatic telegraph system message center including a plurality of outgoing lines extending to distant stations, a plurality of message storage units each operative to store therein for transmission over one of said outgoing lines a telegraph message having assigned thereto any one of a number of different transmission precedence ratings, a plurality of outgoing line circuits corresponding to said outgoing lines each accessible to any one of said message storage units and operative to control transmission of telegraph messages over the corresponding outgoing line, and a link including a finder having access to said outgoing line circuits and an assigner having access to said message storage units, each of said message storage units being operative responsive to a message stored therein to be transmitted over one of said outgoing lines for marking said message storage unit as calling to the corresponding outgoing line circuit and for marking said message storage unit in accordance with the transmission precedence rating of the message stored therein, each of said outgoing line circuits being operative responsive to calling markings extended thereto from said message storage units for marking said outgoing line circuit as called to said link and for marking said calling message storage units to said link, said finder in said link being operative responsive to a called marking extended thereto from one of said outgoing line circuits for finding said one outgoing line circuit and for registering the highest of the transmission precedence ratings marked at said calling message storage units, said assigner in said link being operative to select one of said message storage units marked in accordance with said highest registered transmission precedence rating and for operating said selected one message storage unit to complete a transmission connection therefrom to said one called outgoing line circuit and for thereafter restoring said link.

4. In an automatic telegraph system message center including a plurality of outgoing lines extending to distant stations, a plurality of message storage units arranged in groups and each storage unit being operative to store therein for transmission over one of said outgoing lines a telegraph message having assigned thereto any one of a number of different transmission precedence ratings, a plurality of outgoing line circuits corresponding to said outgoing lines each accessible to any one of said message storage units and operative to control transmission of telegraph messages over the corresponding outgoing line, and a link including a finder having access to said outgoing line circuits and a plurality of assigners having access to the message storage units in the corresponding groups, each of said message storage units being operative responsive to a message stored therein to be transmitted over one of said outgoing lines for marking said message storage unit as calling to the corresponding outgoing line circuit and for marking said message storage unit in accordance with the transmission precedence rating of the message stored therein, each of said outgoing line circuits being responsive to calling markings extended thereto from said message storage units for marking said outgoing line circuit as called to said finder in said link and for marking said calling message storage units to said assigners in said link, said finder in said link being operative responsive to a called marking extended thereto from one of said outgoing line circuits via said one outgoing line circuit and for registering the highest of the transmission precedence ratings marked at said calling message storage units, any one of said assigners in said link being operative to select one of said message storage units marked in accordance with said highest registered transmission precedence rating and for operating said selected one message storage unit to complete a transmission connection therefrom to said one called outgoing line circuit and for thereafter restoring said link.

5. In an automatic telegraph system switching center including a plurality of outgoing lines extending to distant stations, a plurality of outgoing line circuits corresponding to said outgoing lines and arranged in groups and operative to control transmission of telegraph messages over the corresponding outgoing lines, a plurality of message storage units each operative to store therein a telegraph message to be transmitted over one of said outgoing lines, a plurality of first trunks corresponding to said outgoing line circuits and terminated thereat and accessible to each of said message storage units, a plurality of second trunks arranged in groups matched to the groups of said outgoing line circuits and each group including second trunks individual to each of said message storage units, a plurality of links corresponding respectively to the matched groups of said outgoing line circuits and to said individual second trunks and having access respectively to the outgoing line circuits in the corresponding groups thereof and to the individual second trunks in the corresponding groups thereof, trunk selectors in each of said message storage units responsive to a message stored therein to be transmitted over one of said outgoing lines for selecting the one of said first trunks extending to the corresponding outgoing line circuit in one of the groups of outgoing line circuits and for selecting the one of said second trunks extending to the link associated with said one group of outgoing line circuits, control means in each of said outgoing line circuits responsive to the selection of the corresponding first trunk by a selecting one of said message storage units for operating the associated one of said links to seize one of the selected outgoing line circuits in said group, and control means in a selecting one of said message storage units responsive to the seizure of the corresponding selected one of said outgoing line circuits by said associated link for operating said link to seize one of said selected second trunks and responsive to the seizure of the corresponding selected second trunk for completing a transmission connection from said one message storage unit to the corresponding selected outgoing line circuit via said selected first trunk and independent of said link.

6. In an automatic telegraph system switching center including a plurality of outgoing lines extending to distant stations, a plurality of outgoing line circuits corresponding to said outgoing lines and arranged in groups and operative to control transmission of telegraph messages over the corresponding outgoing lines, a plurality of message storage units arranged in groups and each operative to store therein a telegraph message to be transmitted over one of said outgoing lines, a plurality of first trunks corresponding to said outgoing line circuits and terminated thereat and accessible to each of said message storage units, a plurality of second trunks arranged in groups matched to the groups of said outgoing line circuits and each group including second trunks individual to each of said message storage units, a plurality of links corresponding to the groups of said outgoing line circuits, each of said links including a finder having access to the outgoing line circuits of the corresponding group thereof and including a plurality of assigners corresponding to the groups of said message storage units, wherein each of said assigners has access only to the ones of said individual second trunks accessible to the message storage units in the corresponding group thereof, trunk selectors included in each of said message storage units responsive to a message stored therein to be transmitted over one of said outgoing lines for selecting the one of said first trunks extending to the corresponding outgoing line circuit in one of the groups of outgoing line circuits and for selecting the one of said second trunks extending to the link associated with said one group of outgoing line circuits, control means in each of said outgoing line circuits responsive to the selection of the corresponding first trunk by one of said message storage units for operating the finder in the associated one of said link to seize one of the selected outgoing line circuits in said group, control means in each of the selecting ones of said message storage units responsive to the seizure of the corresponding selected one of said outgoing line circuits by said associated link for operating the associated one of said assigners in said link to seize one of said selected second trunks and responsive to the seizure of the corresponding selected second trunk for applying a seizure marking to said selected first trunk, and further means in each of said called outgoing line circuits responsive to a seizure marking on the corresponding first trunk for completing a connection therefrom to the corresponding calling message storage unit over said first trunk and for restoring said associated link.

7. In an automatic telegraph system switching center including a plurality of outgoing lines extending to distant stations, a plurality of outgoing line circuits corresponding to said outgoing lines and arranged in groups and operative to control transmission of telegraph messages over the corresponding outgoing lines, a plurality of message storage units each operative to store therein for transmission over one of said outgoing lines a telegraph message having assigned thereto one of a number of different transmission precedence ratings and to register therein the transmission precedence rating of the stored telegraph message, a plurality of first trunks corresponding to said outgoing line circuits and terminated thereat and accessible to each of said message storage units, a plurality of second trunks arranged in groups matched to the groups of said outgoing line circuits and each group including second trunks individual to each of said message storage units, a plurality of links corresponding respectively to the matched groups of said outgoing line circuits and to said individual second trunks and having access respectively to the outgoing line circuits in the corresponding groups thereof and to the individual second trunks in the corresponding groups thereof, trunk selectors in each of said message storage units responsive to a message stored therein to be transmitted over one of said outgoing lines for selecting the one of said first trunks extending to the corresponding outgoing line circuit in one of the groups of outgoing line circuits and for marking to said selected first trunk the transmission precedence rating registered therein and for selecting the one of said second trunks extending to the link corresponding to said one group of outgoing line circuits and for marking to said selected second trunk the transmission precedence rating registered therein, control means in each of said outgoing line circuits of said groups responsive to the selection of the corresponding first trunk by one of said message storage units for operating the corresponding one of said links to seize one of the selected outgoing line circuits in said group and to register the highest of the transmission precedence ratings marked to the corresponding first trunk, and control means in each of said selecting ones of said message storage units responsive to the seizure of the corresponding selected outgoing line circuit by said associated link for operating said one link to seize one of said selected second trunks marked in accordance with the highest transmission precedence rating registered in said link and responsive to the seizure of the corresponding selected second trunk for causing a transmission connection to be completed from said one selecting message storage unit to the corresponding selected outgoing line circuit via said selected first trunk and independent of said link, whereby of the telegraph messages stored in said message storage units to be transmitted over one of said outgoing lines only the one thereof having the highest of the transmission precedence ratings assigned thereto is transmitted through said corresponding outgoing line circuit and over said one outgoing line.

References Cited in the file of this patent

UNITED STATES PATENTS

| | | |
|---|---|---|
| 2,667,533 | Zenner | Jan. 26, 1954 |
| 2,805,283 | Stiles | Sept. 3, 1957 |